(12) United States Patent
Shibata et al.

(10) Patent No.: US 7,706,309 B2
(45) Date of Patent: Apr. 27, 2010

(54) DATA TRANSFER CONTROL DEVICE, ELECTRONIC INSTRUMENT, AND DATA TRANSFER CONTROL METHOD

(75) Inventors: Yukinari Shibata, Sapporo (JP); Tomonaga Hasegawa, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 978 days.

(21) Appl. No.: 11/073,857

(22) Filed: Mar. 8, 2005

(65) Prior Publication Data
US 2005/0201305 A1 Sep. 15, 2005

(30) Foreign Application Priority Data
Mar. 9, 2004 (JP) ............................. 2004-066091

(51) Int. Cl.
H04B 1/44 (2006.01)
H04B 1/56 (2006.01)

(52) U.S. Cl. .................. 370/282; 370/276; 370/476; 370/293; 375/7; 709/143

(58) Field of Classification Search ................ 370/282, 370/276, 283, 284, 285, 293, 296, 476, 31, 370/217; 710/105; 714/700; 375/371, 356; 711/168; 713/400
See application file for complete search history.

(56) References Cited

U.S. PATENT DOCUMENTS

| | | | | |
|---|---|---|---|---|
| 5,054,019 | A * | 10/1991 | Mathis et al. | 370/296 |
| 6,675,243 | B1 * | 1/2004 | Bastiani et al. | 710/105 |
| 6,891,793 | B1 * | 5/2005 | Suzuki et al. | 370/217 |
| 2001/0036203 | A1 * | 11/2001 | Yamaguchi et al. | 370/535 |
| 2002/0011998 | A1 | 1/2002 | Tamura | |
| 2003/0103470 | A1 * | 6/2003 | Yafuso | 370/282 |
| 2003/0142693 | A1 * | 7/2003 | Umayabashi et al. | 370/476 |
| 2005/0201162 | A1 | 9/2005 | Shibata et al. | |
| 2005/0201411 | A1 | 9/2005 | Shibata et al. | |

(Continued)

FOREIGN PATENT DOCUMENTS

CN 1389800 A 1/2003

(Continued)

OTHER PUBLICATIONS

IEEE Std. 802.3, 2000 Edition, 35.2.4 transmission code, pp. 966-967.

(Continued)

*Primary Examiner*—Aung S Moe
*Assistant Examiner*—Jamal Javaid
(74) *Attorney, Agent, or Firm*—Oliff & Berridge, PLC

(57) ABSTRACT

A data transfer control device includes: a transmitter circuit; a receiver circuit; a transfer direction switch circuit which performs switching a transfer direction; a transfer direction switch indication circuit which indicates the transfer direction switch circuit to switch the transfer direction; and a code generation circuit which generates a transfer direction switch request code when a transfer direction switch request has been received from an upper layer circuit. When the transfer direction switch request has been received from the upper layer circuit, the transmitter circuit transmits the transfer direction switch request code through a serial signal line, and the transfer direction switch indication circuit indicates the transfer direction switch circuit to switch from a transmission direction to a reception direction after the transfer direction switch request code has been transmitted.

9 Claims, 23 Drawing Sheets

U.S. PATENT DOCUMENTS

2006/0183424 A1* 8/2006 Linde .................. 455/41.2

FOREIGN PATENT DOCUMENTS

| JP | A 11-284609 | 10/1999 |
| JP | A 2001-222249 | 8/2001 |
| JP | A 2002-101084 | 4/2002 |
| JP | A 2003-224573 | 8/2003 |
| JP | A 2004-040692 | 2/2004 |
| JP | A 2004-142643 | 5/2004 |
| JP | A 2005-260360 | 9/2005 |

OTHER PUBLICATIONS

Takashi Satomi et al., "A complete study of the high speed bus system." Interface, vol. 29, No. 7, pp. 80-100 (w/ abstract).

* cited by examiner

FIG. 4

| K CODE NAME | ASSIGNED CODE NAME | CurrentRd− | CurrentRd+ |
|---|---|---|---|
| K28.0 | Reserved | 0011110100 | 1100001011 |
| K28.1 | PREAMBLE(PRE) | 0011111001 | 1100000110 |
| K28.2 | STOP | 0011110101 | 1100001010 |
| K28.3 | ABORT | 0011110011 | 1100001100 |
| K28.4 | DIVISION | 0011110010 | 1100001101 |
| K28.5 | DATA POWER DOWN | 0011111010 | 1100000101 |
| K28.6 | DIRECTION | 0011110110 | 1100001001 |
| K28.7 | ALL POWER DOWN | 0011111000 | 1100000111 |
| K23.7 | Reserved | 1110101000 | 0001010111 |
| K27.7 | Reserved | 1101101000 | 0010010111 |
| K29.7 | Reserved | 1011101000 | 0100010111 |
| K30.7 | Reserved | 0111101000 | 1000010111 |

FIG. 5A  NORMAL TRANSFER
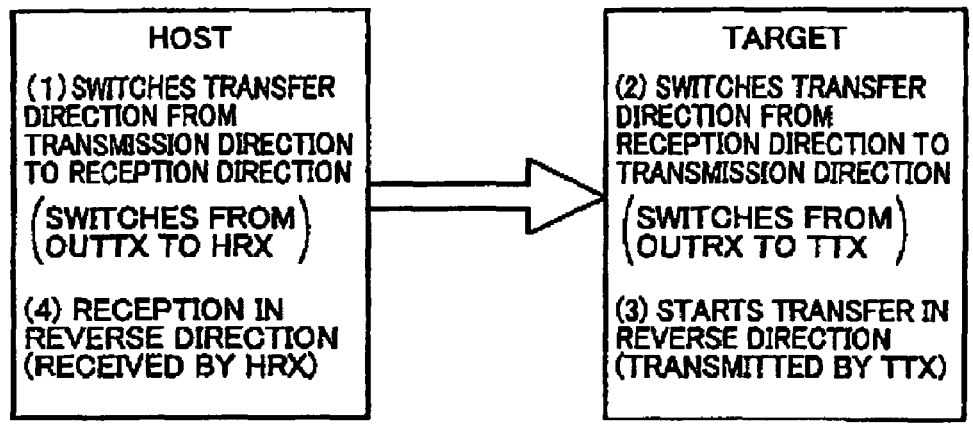
FIG. 5B  RECEPTION ERROR
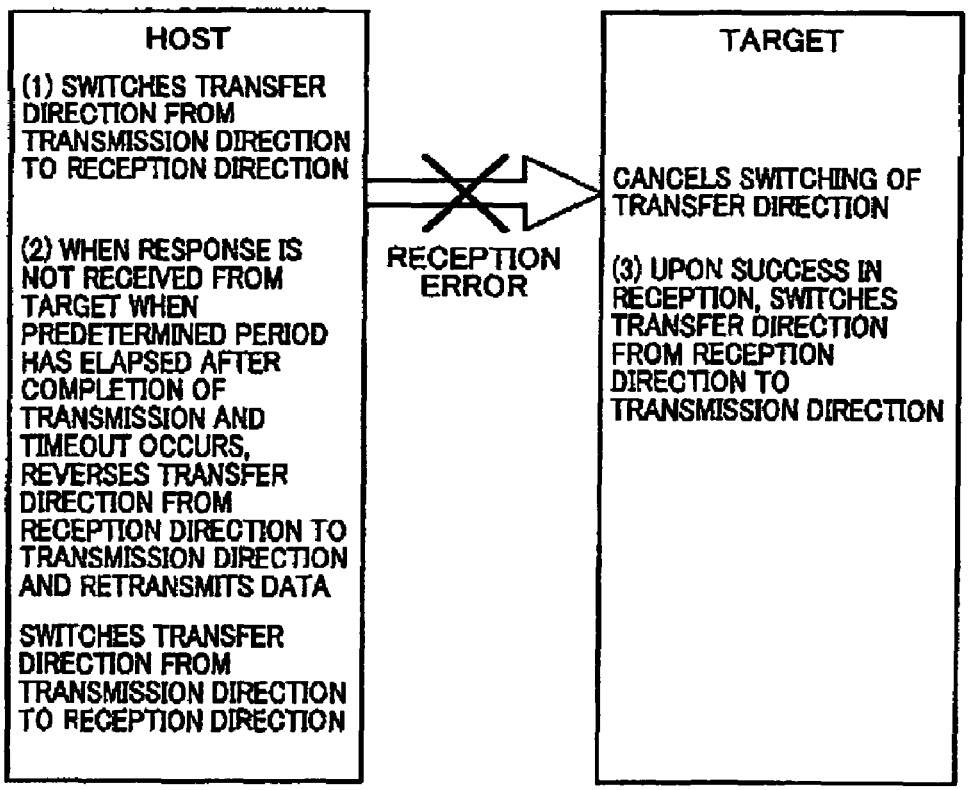

FIG. 13

| RxCode VALUE | TRANSFER RATE |
|---|---|
| 0 | DATA RECEPTION |
| 1 | ABORT DETECTION |
| 2 | Data Powerdown |
| 3 | All Powerdown |
| 4 | PREAMBLE DETECTION (PRE) |
| 5 | DUMMY DETECTION |
| 6 | RECEPTION ERROR DETECTION |
| 7 | Reserved |
| 8 | Reserved |
| 9 | Reserved |
| A | Reserved |
| B | Reserved |
| C | Reserved |
| D | Reserved |
| E | MULTICHANNEL DIVISION TRANSFER NOTIFICATION DETECTION |
| F | TRANSFER DIRECTION SWITCH REQUEST RECEPTION (DIR) |

FIG. 14

| TxCode VALUE | TRANSFER RATE |
|---|---|
| 0 | DATA TRANSMISSION |
| 1 | ABORT |
| 2 | Data Powerdown |
| 3 | All Powerdown |
| 4 | PREAMBLE INSERTION (PRE) |
| 5 | DUMMY INSERTION |
| 6 | Reserved |
| 7 | Reserved |
| 8 | Reserved |
| 9 | Reserved |
| A | Reserved |
| B | Reserved |
| C | Reserved |
| D | Reserved |
| E | MULTICHANNEL DIVISION TRANSFER EXECUTION NOTIFICATION |
| F | TRANSFER DIRECTION SWITCH REQUEST (DIR) |

COMMAND/DATA WRITE SUCCESS (RESPONSE REQUESTED)

US 7,706,309 B2

DATA TRANSFER CONTROL DEVICE, ELECTRONIC INSTRUMENT, AND DATA TRANSFER CONTROL METHOD

Japanese Patent Application No. 2004-66091 filed on Mar. 9, 2004, is hereby incorporated by reference in its entirety.

BACKGROUND OF THE INVENTION

The present invention relates to a data transfer control device, an electronic instrument, and a data transfer control method.

In recent years, a high-speed serial transfer interface such as low voltage differential signaling (LVDS) has attracted attention as an interface standard aiming at reducing EMI noise or the like. In such a high-speed serial transfer interface, data transfer is implemented by causing a transmitter circuit to transmit serialized data using differential signals and a receiver circuit to differentially amplify the differential signals (Japanese Patent Application Laid-open No. 2001-222249).

A portable telephone includes a first instrument section provided with buttons for inputting a telephone number or a character, a second instrument section provided with a main liquid crystal display (LCD), a sub LCD, or a camera (one or a plurality of devices), and a connection section such as a hinge which connects the first and second instrument sections. In this case, the number of interconnects which pass through the connection section can be reduced by performing data transfer between a first substrate provided in the first instrument section and a second substrate provided in the second instrument section by serial transfer using serial signal lines. Therefore, a high-speed serial interface which can implement efficient serial transfer in the connection section has been demanded.

An application processor mounted on the first substrate transfers display data to the main LCD or the sub LCD. There may be a case where the main LCD or the sub LCD transfers the status information to the application processor. In this case, the display data transferred from the application processor to the main LCD or the sub LCD accounts for most of the transfer data. Therefore, the transfer method in such an application need not be a full-duplex transfer method in which data can be received while transmitting data, but may be a half-duplex transfer method in which data can be transferred in either direction but data transmission and data reception cannot be performed at the same time. The number of interconnects passing through the first and second instrument sections can be further reduced in comparison with the full-duplex transfer method by using the half-duplex transfer method, whereby the design of the connection section or the like can be facilitated.

SUMMARY

A first aspect of the present invention relates to a data transfer control device for performing data transfer through a serial signal line, the data transfer control device including:

a transmitter circuit which transmits data through a serial signal line;

a receiver circuit which receives data through a serial signal line;

a transfer direction switch circuit which performs switching between a transmission direction and a reception direction, the transmission direction being a transfer direction in which data is transmitted by the transmitter circuit, and the reception direction being a transfer direction in which data is received by the receiver circuit;

a transfer direction switch indication circuit which indicates the transfer direction switch circuit to switch the transfer direction; and a code generation circuit which generates a transfer direction switch request code when a transfer direction switch request has been received from an upper layer circuit, wherein, when the transfer direction switch request has been received from the upper layer circuit, the transmitter circuit transmits the transfer direction switch request code generated by the code generation circuit to a partner-side data transfer control device through a serial signal line, and the transfer direction switch indication circuit indicates the transfer direction switch circuit to switch the transfer direction from the transmission direction to the reception direction after the transfer direction switch request code has been transmitted.

A second aspect of the present invention relates to a data transfer control device for performing data transfer through a serial signal line, the data transfer control device including:

a transmitter circuit which transmits data through a serial signal line;

a receiver circuit which receives data through a serial signal line;

a transfer direction switch circuit which performs switching between a transmission direction and a reception direction, the transmission direction being a transfer direction in which data is transmitted by the transmitter circuit, and the reception direction being a transfer direction in which data is received by the receiver circuit;

a transfer direction switch indication circuit which indicates the transfer direction switch circuit to switch the transfer direction;

a code detection circuit which detects a transfer direction switch request code received by the receiver circuit; and a notification signal generation circuit which generates a notification signal and outputs the generated notification signal to an upper layer circuit, wherein, when the transfer direction switch request code has been detected by the code detection circuit, the transfer direction switch indication circuit indicates the transfer direction switch circuit to switch the transfer direction from the reception direction to the transmission direction, and the notification signal generation circuit generates a signal informing that a transfer direction switch request has been received from a partner-side data transfer control device and outputs the generated signal to the upper layer circuit.

A third aspect of the present invention relates to an electronic instrument including:

one of the above data transfer control devices; and at least one of a communication device, a processor, an imaging device, and a display device.

A fourth aspect of the present invention relates to a data transfer control method for controlling data transfer between first and second data transfer control devices connected through a serial signal line, each of first and second data transfer control devices including:

a transmitter circuit which transmits data by current-driving a serial signal line;

a receiver circuit which receives data by detecting current flowing through a serial signal line; and a transfer direction switch circuit which performs switching between a transmission direction and a reception direction, the transmission direction being a transfer direction in which data is transmitted by the transmitter circuit, and the reception direction being a transfer direction in which data is received by the receiver circuit;

the method including:

causing the transfer direction switch circuit of the first data transfer control device to switch the transfer direction from the transmission direction to the reception direction; and causing the transfer direction switch circuit of the second data transfer control device to switch the transfer direction from the reception direction to the transmission direction after the transfer direction of the first data transfer control device has been switched from the transmission direction to the reception direction.

BRIEF DESCRIPTION OF THE SEVERAL VIEWS OF THE DRAWING

FIG. 4 is a table illustrative of a method of assigning various codes to special codes.

FIGS. 5A and 5B are illustrative of an outline of a half-duplex transfer method in an embodiment of the present invention.

FIG. 13 shows an example of RxCode.

FIG. 14 shows an example of TxCode.

DETAILED DESCRIPTION OF THE EMBODIMENT

Figure 1:
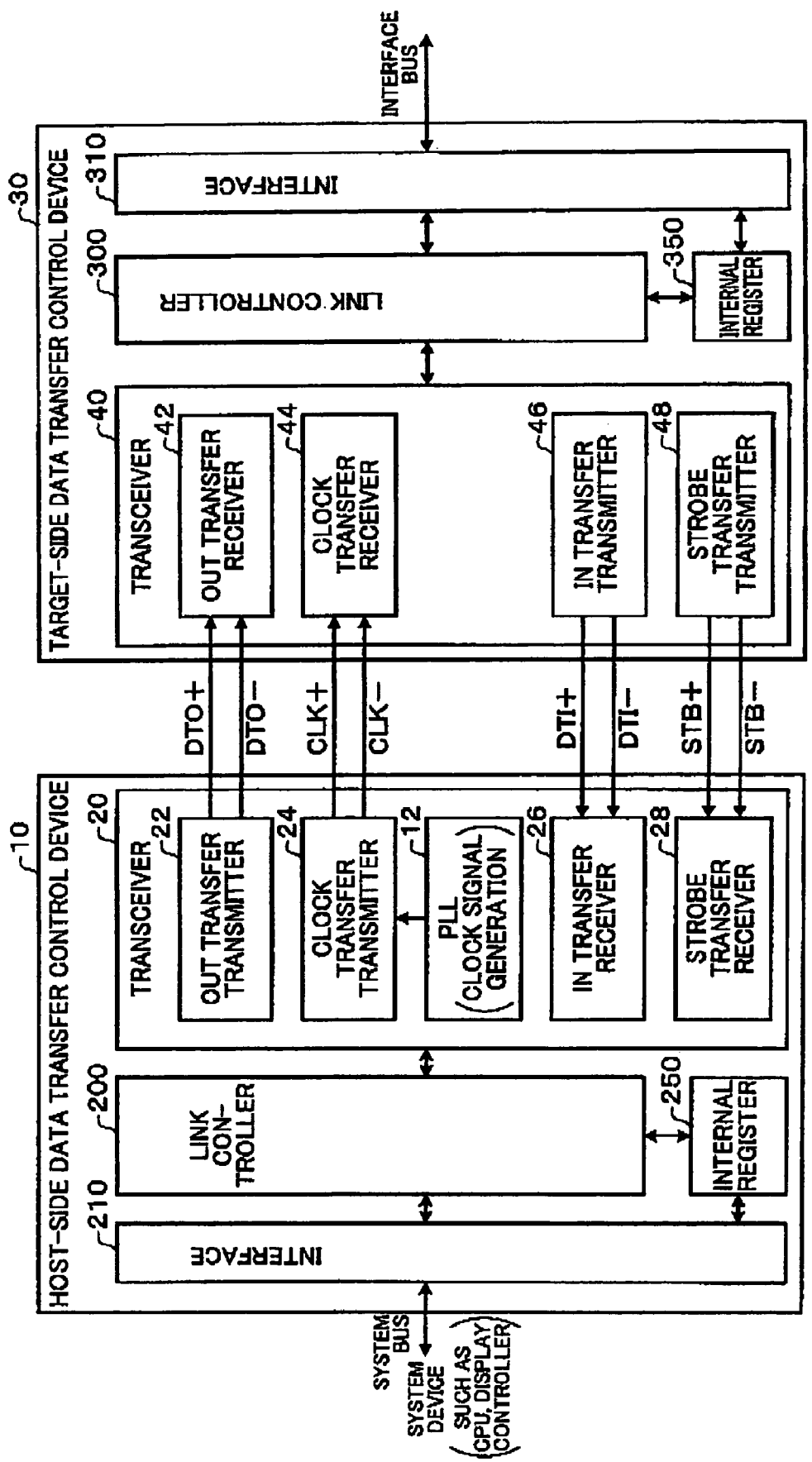
FIG. 1 shows a data transfer control device.

The present invention has been achieved in view of the above-described technical problem and may provide a data transfer control device, an electronic instrument, and a data transfer control method suitable for serial transfer using a half-duplex transfer method.

One embodiment of the present invention provides a data transfer control device for performing data transfer through a serial signal line, the data transfer control device including:

a transmitter circuit which transmits data through a serial signal line;

a receiver circuit which receives data through a serial signal line;

a transfer direction switch circuit which performs switching between a transmission direction and a reception direction, the transmission direction being a transfer direction in which data is transmitted by the transmitter circuit, and the reception direction being a transfer direction in which data is received by the receiver circuit;

a transfer direction switch indication circuit which indicates the transfer direction switch circuit to switch the transfer direction; and a code generation circuit which generates a transfer direction switch request code when a transfer direction switch request has been received from an upper layer circuit, wherein, when the transfer direction switch request has been received from the upper layer circuit, the transmitter circuit transmits the transfer direction switch request code generated by the code generation circuit to a partner-side data transfer control device through the serial signal line, and the transfer direction switch indication circuit indicates the transfer direction switch circuit to switch the transfer direction from the transmission direction to the reception direction after the transfer direction switch request code has been transmitted.

In this embodiment, when the transfer direction switch request is transmitted from the upper layer circuit, the transfer direction switch request code is transmitted to the partner-side data transfer control device through the serial signal line, and the transfer direction is switched from the transmission direction to the reception direction after transmission of the transfer direction switch request code. Therefore, since a situation in which two transmitter circuits are connected with a serial signal line at the switch timing of the transfer direction can be prevented, a data transfer control device suitable for serial transfer using a half-duplex transfer method can be provided.

This data transfer control device may include:

an encoder circuit which encodes data by using an encoding method which expands N bits of data to M bits (N<M; N and M are integers larger than one) of data; and a parallel/serial conversion circuit which converts parallel data received from the encoder circuit to serial data and outputs the serial data to the transmitter circuit, and the code generation circuit may generate the transfer direction switch request code by generating a special code assigned to the transfer direction switch request code among special codes defined by the encoding method.

This enables the partner-side data transfer control device to be notified of the transfer direction switch request by effectively using the special code defined by the encoding method.

With this data transfer control device, the code generation circuit may receive a special code generation direction signal from the upper layer circuit, and may generate the transfer direction switch request code when generation of the transfer direction switch request code has been directed by the special code generation direction signal.

The processing and configuration of the code generation circuit can be simplified by generating the special code by using the special code generation direction signal as described above, whereby the circuit scale can be reduced.

With this data transfer control device, the transmitter circuit may transmit the transfer direction switch request code through the serial signal line in addition to data transmitted through the serial signal line.

This enables the transfer direction to be changed in the next transaction, whereby the efficiency of processing can be improved.

With this data transfer control device, the transmitter circuit may output an idle signal, logical level of which is continuously fixed at a first logical level in units of a given number of bits or more to the serial signal line after transmitting the transfer direction switch request code through the serial signal line.

This enables the switch timing of the transfer direction to be easily made the same between the partner-side data transfer control devices.

This data transfer control device may include a link controller as the upper layer circuit, when a response packet has not been received from the partner-side data transfer control device after transmission of the transmitter circuit has been completed and a predetermined period of time has elapsed and a timeout has occurred, the link controller may issue a transfer direction switch request which causes the transfer direction to be reversed from the reception direction to the transmission direction.

This enables a packet to be retransmitted to the partner-side data transfer control device while preventing two transmitter circuits from being connected with the serial signal line.

This data transfer control device may include a link controller as the upper layer circuit, upon receiving a packet informing a CRC error from the partner-side data transfer control device after completion of transmission of the transmitter circuit, the link controller may issue a transfer direction switch request which causes the transfer direction to be reversed from the reception direction to the transmission direction.

This makes it possible to deal with occurrence of a CRC error.

Another embodiment of the present invention provides a data transfer control device for performing data transfer through a serial signal line, the data transfer control device including:

a transmitter circuit which transmits data through a serial signal line;

a receiver circuit which receives data through a serial signal line;

a transfer direction switch circuit which performs switching between a transmission direction and a reception direction, the transmission direction being a transfer direction in which data is transmitted by the transmitter circuit, and the reception direction being a transfer direction in which data is received by the receiver circuit;

a transfer direction switch indication circuit which indicates the transfer direction switch circuit to switch the transfer direction;

a code detection circuit which detects a transfer direction switch request code received by the receiver circuit; and a notification signal generation circuit which generates a notification signal and outputs the generated notification signal to an upper layer circuit, wherein, when the transfer direction switch request code has been detected by the code detection circuit, the transfer direction switch indication circuit indicates the transfer direction switch circuit to switch the transfer direction from the reception direction to the transmission direction, and the notification signal generation circuit generates a signal informing that a transfer direction switch request has been received from a partner-side data transfer control device and outputs the generated signal to the upper layer circuit.

In this embodiment, when the transfer direction switch request code has been detected, the transfer direction is switched from the reception direction to the transmission direction, and the upper layer circuit is notified of the transfer direction switch request. Therefore, a situation in which two transmitter circuits are connected with a serial signal line at the switch timing of the transfer direction can be prevented, whereby a data transfer control device suitable for serial transfer using a half-duplex transfer method can be provided.

This data transfer control device may include:

a serial/parallel conversion circuit which converts serial data received from the receiver circuit to parallel data; and a decoder circuit which receives the parallel data from the serial/parallel conversion circuit and performs decode processing of data and a special code encoded by using a predetermined encoding method, and the code detection circuit may detect the transfer direction switch request code by detecting a special code assigned to the transfer direction switch request code among special codes defined by the encoding method.

This enables the transfer direction switch request code to be detected by effectively using the special code defined by the encoding method, whereby the circuit and the processing can be simplified.

With this data transfer control device, when a reception error has been detected at the time of or before detection of the transfer direction switch request code by the code detection circuit, the transfer direction switch indication circuit may cancel switch indication of the transfer direction from the reception direction to the transmission direction.

This prevents such a situation in which two transmitter circuits are connected with the serial signal line when a reception error has occurred.

This data transfer control device may include a link controller as the upper layer circuit, and when a CRC error of a packet received from the partner-side data transfer control device has been detected, the link controller may transmit a packet for informing the CRC error to the partner-side data transfer control device, and may issue a transfer direction switch request which causes the transfer direction to be reversed from the transmission direction to the reception direction after completion of transmission of the packet.

This makes it possible to properly deal with occurrence of a CRC error.

A further embodiment of the present invention provides an electronic instrument including:

one of the above data transfer control devices; and at least one of a communication device, a processor, an imaging device, and a display device.

A still further embodiment of the present invention provides a data transfer control method for controlling data transfer between first and second data transfer control devices connected through a serial signal line, each of first and second data transfer control devices including:

a transmitter circuit which transmits data by current-driving a serial signal line;

a receiver circuit which receives data by detecting current flowing through a serial signal line; and a transfer direction switch circuit which performs switching between a transmission direction and a reception direction, the transmission direction being a transfer direction in which data is transmitted by the transmitter circuit, and the reception direction being a transfer direction in which data is received by the receiver circuit;

the method including:

causing the transfer direction switch circuit of the first data transfer control device to switch the transfer direction from the transmission direction to the reception direction; and causing the transfer direction switch circuit of the second data transfer control device to switch the transfer direction from the reception direction to the transmission direction after the transfer direction of the first data transfer control device has been switched from the transmission direction to the reception direction.

According to this embodiment, the transfer direction in the second data transfer control device is switched from the reception direction to the transmission direction after the transfer direction in the first data transfer control device has been switched from the transmission direction to the reception direction. Therefore, half-duplex transfer using serial transfer can be implemented while preventing a situation in which two transmitter circuits from being connected with the serial signal line.

This method may include canceling switching of the transfer direction of the second data transfer control device from the reception direction to the transmission direction when a reception error has occurred.

This method may include canceling switching of the transfer direction of the second data transfer control device from the reception direction to the transmission direction when the reception error has occurred at the time of or before detection of a transfer direction switch request from the first data transfer control device to the second data transfer control device.

Embodiments of the present invention are described below in detail. Note that the embodiments described hereunder do not in any way limit the scope of the invention defined by the claims laid out herein. Note also that not all of the elements of these embodiments should be taken as essential requirements to the means of the present invention.

1. Data Transfer Control Device

FIG. 1 shows host-side and target-side data transfer control devices 10 and 30 according to one embodiment of the present invention. In this embodiment, a bridge function between a system bus and an interface bus is implemented by using the host-side and target-side data transfer control devices 10 and 30. The data transfer control device in the present invention is not limited to the data transfer control devices 10 and 30 shown in FIG. 1. Some of the circuit blocks shown in FIG. 1 may be omitted, or the connection configuration between the circuit blocks may be changed, or a circuit block differing from the circuit blocks shown in FIG. 1 may be added. For example, at least one of link controllers 200 and 300 and interface circuits 210 and 310 may be omitted.

The host (TX) side data transfer control device 10 and the target (RX) side data transfer control device 30 transfer packets through a serial bus for differential signals, for example. In more detail, the data transfer control devices 10 and 30 transmit and receive packets by current-driving (or voltage-driving) differential signal lines (serial signal lines in a broad sense; hereinafter the same) of the serial bus.

The host-side data transfer control device 10 includes an interface circuit 210 which performs interface processing with a system device such as a CPU and a display controller. The interface circuit 210 implements an RGB interface, MPU interface, or serial interface with the system device.

The host-side data transfer control device 10 includes the link controller 200 which performs link layer processing (packet generation, packet analysis, transaction control, and the like). The link controller 200 performs processing of generating a packet (request packet, stream packet, and the like) transferred to the target-side data transfer control device 30 through the serial bus, and transmitting the generated packet. In more detail, the link controller 200 starts a transmission transaction and directs a transceiver 20 to transmit the generated packet.

The host-side data transfer control device 10 includes the transceiver 20 which performs physical layer processing or the like. The transceiver 20 transmits a packet indicated by the link controller 200 to the target-side data transfer control device 30 through the serial bus. The transceiver 20 receives a packet from the target-side data transfer control device 30. In this case, the link controller 200 analyzes the received packet and performs the link layer (transaction layer) processing.

The host-side data transfer control device 10 includes an internal register 250. The internal register 250 includes a port access register, a configuration register, an LVDS register, an interrupt control register, a target (RX) register, a power-down mode setting register, and the like. The system device writes an address (command) or data (parameter) into the internal register 250 through the system bus, or reads read data, status information, or the like from the internal register 250. The information in the target register of the internal register 250 is packetized and transferred to an internal register 350 of the target-side data transfer control device 30 through the serial bus. Specifically, the target-side internal register 350 is a subset (shadow register) of the host-side internal register 250.

The target-side data transfer control device 30 includes the transceiver 40 which performs physical layer processing or the like. The transceiver 40 receives a packet from the host-side data transfer control device 10 through the serial bus. The transceiver 40 transmits a packet to the host-side data transfer control device 10. In this case, the link controller 300 generates a packet to be transmitted and directs transmission of the generated packet.

The target-side data transfer control device 30 includes the link controller 300. The link controller 300 performs link layer (transaction layer) processing of receiving a packet from the host-side data transfer control device 10 and analyzing the received packet.

The target-side data transfer control device 30 includes an interface circuit 310 which performs interface processing with one or more devices (main LCD, sub LCD, camera, and the like) connected with the interface bus. The interface circuit 310 may include an RGB interface circuit, an MPU interface circuit, a serial interface circuit, or the like (not shown).

The target-side data transfer control device 30 includes the internal register 350. The internal register 350 stores information necessary for the target. In more detail, the internal register 350 stores interface information for specifying the signal form (output format) of an interface signal output from the interface circuit 310 or the like.

2. Serial Transfer Method

A serial transfer method and the transceivers 20 and 40 in this embodiment are described below. In this embodiment, the host-side data transfer control device 10 is the side which supplies a clock signal, and the target-side data transfer control device 30 is the side which operates using the supplied clock signal as a system clock signal.

In FIG. 1, DTO+ and DTO− are data (OUT data) output to the target (data transfer control device 30) from the host (data transfer control device 10). CLK+ and CLK− indicate clock signals supplied from the host to the target. The host outputs the data DTO+/− in synchronization with the edge (rising edge, for example, but may be falling edge) of the strobes CLK+/−. Therefore, the target can sample and capture the data DTO+/− using the clock signals CLK+/−. In FIG. 1, the target operates based on the clock signals CLK+/− supplied from the host. Specifically, the clock signals CLK+/− serve as the system clock signals of the target. Therefore, the phase locked loop (PLL) circuit 12 (clock generation circuit in a broad sense) is provided in the host, and is not provided in the target. The clock signal CLK may be supplied by a system clock signal from the outside without providing the PLL circuit 12.

DTI+ and DTI− indicate data (IN data) output from the target to the host. STB+ and STB− indicate strobes (clock signals in a broad sense) supplied from the target to the host. The target generates the strobes STB+/− based on the clock signals CLK+/− supplied from the host, and outputs the generated strobes STB+/−. The target outputs the data DTI+/− in synchronization with the edge (rising edge, for example, but may be falling edge) of the strobes STB+/−. Therefore, the host can sample and capture the data DTI+/− using the strobes STB+/−.

Each of the data DTO+/−, the clock signals CLK+/−, the data DTI+/−, and the strobes STB+/− is transmitted by allowing a transmitter circuit (driver circuit) to current-drive the corresponding differential signal line (serial signal line in a broad sense). In order to implement a higher speed transfer, two or more pairs of the DTO+/− differential signal lines and the DTI+/− differential signal lines may be provided.

The host-side transceiver 20 includes OUT transfer (data transfer in a broad sense) and clock transfer transmitter circuits 22 and 24, and IN transfer (data transfer in a broad sense) and strobe transfer (clock transfer in a broad sense) receiver circuits 26 and 28. The target-side transceiver 40 includes OUT transfer and clock transfer receiver circuits 42 and 44, and IN transfer and strobe transfer transmitter circuits 46 and 48. A configuration in which some of these circuit blocks are omitted may be employed. In the case where a full-duplex transfer is unnecessary, a configuration in which the host-side receiver circuits 26 and 28 and the target-side transmitter circuits 46 and 48 are omitted may be employed.

The OUT transfer and clock transfer transmitter circuits 22 and 24 respectively transmit the data DTO+/− and the clock signals CLK+/− by current-driving the DTO+/− differential signal lines and the CLK+/− differential signal lines (driving the serial signal lines in a broad sense). The OUT transfer and clock transfer receiver circuits 42 and 44 respectively receive the data DTO+/− and the clock signals CLK+/− by performing a current/voltage conversion based on the current which flows through the DTO+/− differential signal lines and the CLK+/− differential signal lines, and performing comparison processing (differential amplification processing) between differential voltage signals (first and second voltage signals) obtained by the current/voltage conversion.

The IN transfer and clock transfer transmitter circuits 46 and 48 respectively transmit the data DTI+/− and the strobes STB+/− by current-driving the DTI+/−differential signal lines and the STB+/− differential signal lines (driving the serial signal lines). The IN transfer and strobe transfer receiver circuits 26 and 28 respectively receive the data DTI+/− and the strobes STB+/− by performing a current/voltage conversion based on the current which flows through the DTI+/− differential signal lines and the STB+/− differential signal lines, and performing comparison processing (differential amplification processing) between differential voltage signals (first and second voltage signals) obtained by the current/voltage conversion. The following description is given taking a differential transfer method using the differential signals as an example. However, this embodiment may also be applied to a single end transfer.

3. Detailed Configuration

Figure 2:
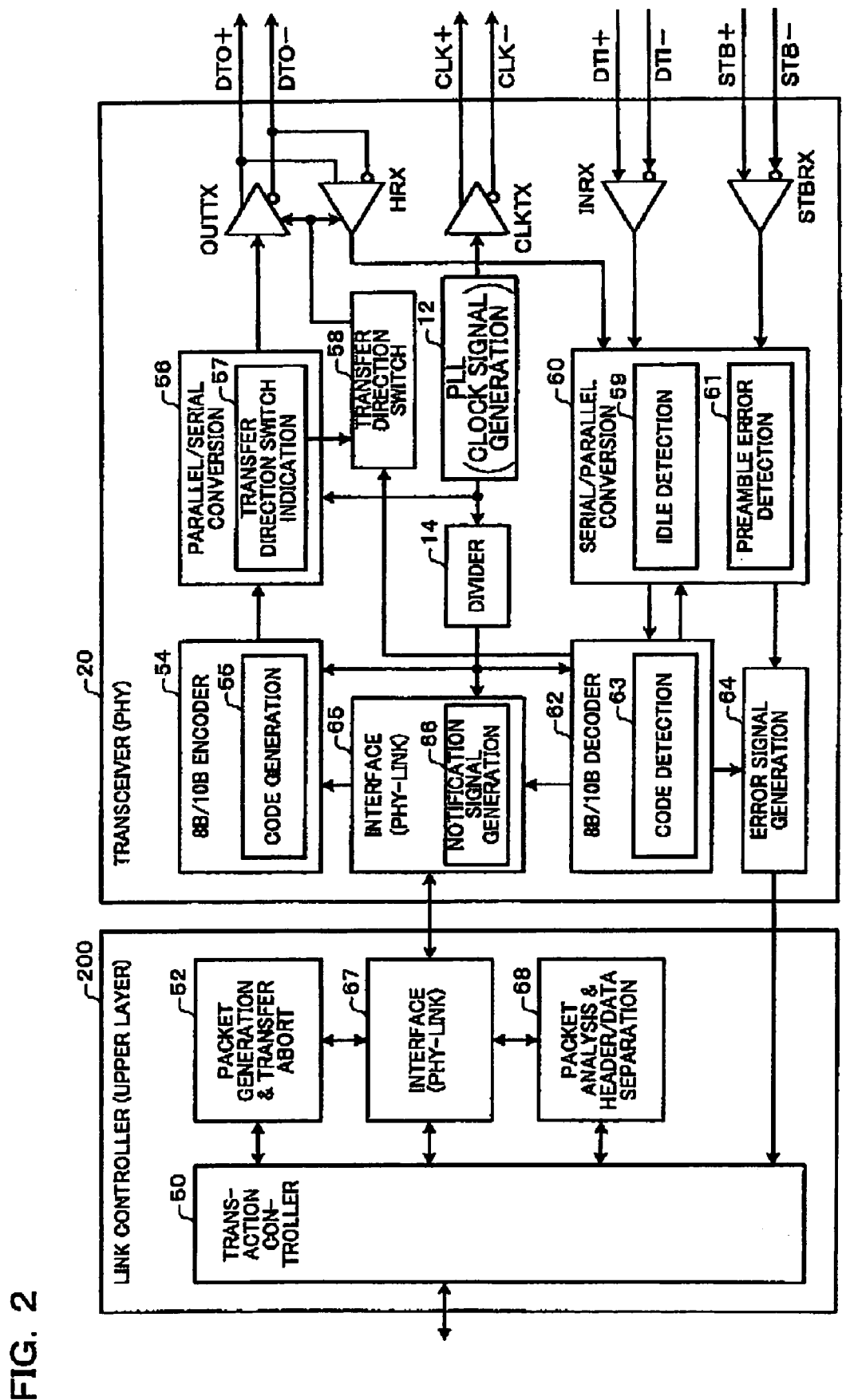
FIG. 2 shows a host-side transceiver and link controller.
Figure 3:
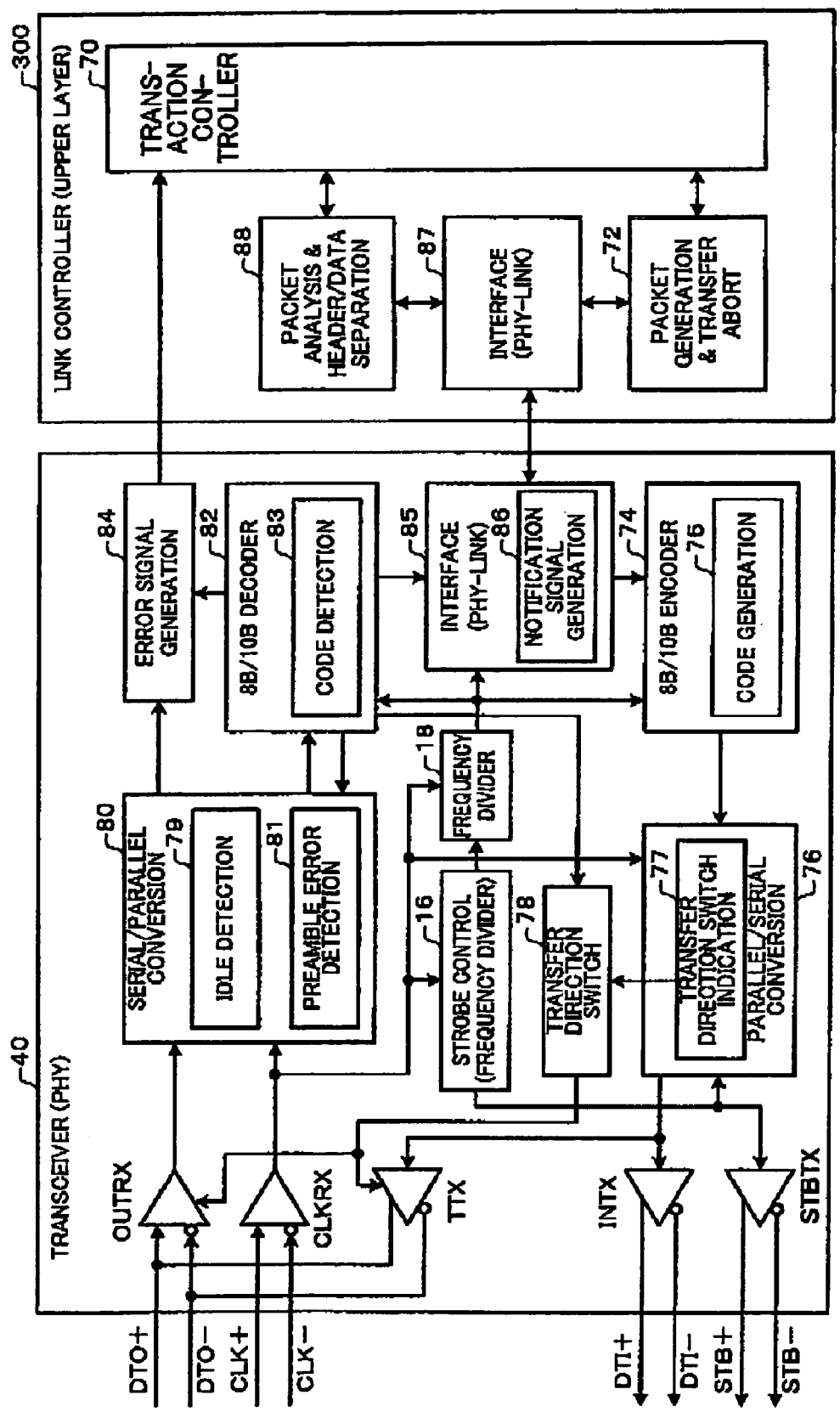
FIG. 3 shows a target-side transceiver and link controller.

FIGS. 2 and 3 show a detailed configuration of this embodiment. Some of the circuit blocks shown in FIGS. 2 and 3 may be omitted, or another circuit block may be added. In the following description, the host-side transmitter circuits 22 and 24 and receiver circuits 26 and 28 are appropriately indicated by OUTTX, CLKTX, INRX, and STBRX, respectively. The target-side transmitter circuits 42 and 44 and receiver circuits 46 and 48 are appropriately indicated by OUTRX, CLKRX, INTX, and STBTX, respectively.

FIG. 2 shows the host-side transceiver 20 and link controller 200. In FIG. 2, a transaction controller 50 included in the link controller 200 (higher layer circuit in a broad sense) performs data transfer transaction control. In more detail, the transaction controller 50 directs transfer of packets such as a request packet, an acknowledge packet, or a stream packet. A packet generation & transfer abort circuit 52 performs processing of generating a packet (packet header) of which transfer is directed by the transaction controller 50, and processing of aborting data transfer.

The 8B/10B encoder circuit 54 (encode circuit in a broad sense) included in the transceiver 20 performs encode processing using an 8B/10B encoding method (encoding method which expands N bits to M bits (N<M, N and M are integers larger than one) in a broad sense). A code generation circuit 55 included in the 8B/10B encode circuit 54 performs generation processing of a special code of 10 bits (M bits in a broad sense) defined in 8B/10B encoding. In more detail, the code generation circuit 55 performs generation processing or addition processing of z preamble code, a stop code, an abort code, and a direction code (transfer direction switch request code) assigned to the special code of the 8B/10B encoding method. The encoding method performed by the encode circuit 54 is not limited to the 8B/10B encoding method.

The parallel/serial conversion circuit 56 converts parallel data received from the 8B/10B encode circuit 54 into serial data. The OUTTX receives the serial data from the parallel/serial conversion circuit 56, and transmits the data by driving the DTO+/− serial signal lines. The CLKTX receives a clock signal generated by the PLL circuit 12, and transmits the clock signal by driving the CLK+/− serial signal lines. The OUTTX and CLKTX are formed by analog circuits which current-drive (or voltage-drive) the serial signal lines. The clock signal generated by the PLL circuit 12 is divided by a frequency divider circuit 14, and is supplied to the circuit blocks (blocks which process parallel data) in the transceiver 20 and the link controller 200.

The INRX receives data transferred through the DTI+/− serial signal lines, and outputs the received serial data to a serial/parallel conversion circuit 60. The STBRX receives strobes (clock signals) transferred through the STB+/− serial signal lines, and outputs the received strobes to the serial/parallel conversion circuit 60. The INRX and STBRX may be formed by analog circuits which detect the drive current (or drive voltage) of the serial signal lines.

The serial/parallel conversion circuit 60 converts serial data transferred through the DTI+/− serial signal lines to parallel data. In more detail, the serial/parallel conversion circuit 60 samples serial data transferred through the DTI+/− serial signal lines based on the strobes (clock signals) transferred through the STB+/− serial signal lines. The serial/parallel conversion circuit 60 converts the sampled serial data to parallel data.

The serial/parallel conversion circuit 60 includes an idle detection circuit 59 and a preamble error detection circuit 61. The idle detection circuit 59 is a circuit which detects an idle signal "0" (idle signal of which the logical level is fixed at a first logical level) using the differential signals, for example. The preamble error detection circuit 61 performs detection processing of the preamble code which is one of special codes in the 8B/10B encoding method. When a preamble error, which is an error state in which a preamble error has not been detected, is detected, the preamble error detection circuit 61 notifies the link controller 200 of detection of the preamble error.

An 8B/10B decoder circuit 62 (decoder circuit in a broad sense) performs decode processing of data and the special code encoded using the 8B/10B encoding method. A code detection circuit 63 included in the 8B/10B decoder circuit 62 performs detection processing of the special code specified by the 8B/10B encoding. In more detail, the code detection circuit 63 performs detection processing of a stop code, an abort code, or a direction code (transfer direction switch request code) assigned to the special code of the 8B/10B encoding method.

An error signal generation circuit 64 generates an error signal when the preamble error has been detected or a disparity error or a decode error has been detected, and outputs the error signal to the transaction controller 50.

An interface circuit 65 is a circuit which performs PHY-LINK (transceiver-link controller) interface processing. The interface circuit 65 includes a notification signal generation circuit 66 which generates a notification signal and outputs the notification signal to the link controller 200 (upper layer circuit). The notification signal generation circuit 66 generates a signal which indicates that a transfer direction switch request has been sent from the target-side data transfer control device 30 (partner-side data transfer control device in a broad sense), and outputs the signal to the link controller 200, for example.

A packet analysis & header/data separation circuit 68 included in the link controller 200 performs analysis processing of a received packet or processing of separating the header and data of the received packet. An interface circuit 67 included in the link controller 200 is a circuit which performs PHY-LINK interface processing.

In this embodiment, half-duplex transfer using the data DTO+ and DTO− can be performed. Therefore, a receiver circuit HRX connected with the DTO+ and DTO− serial signal lines is provided. The circuit HRX receives data transferred through the DTO+ and DTO− serial signal lines when the transfer direction is changed during half-duplex transfer. A transfer direction switch circuit 58 achieves switching between a transmission direction which is the transfer direction in which data is transmitted by the circuit OUTTX and a reception direction which is the transfer direction in which data is received by the circuit HRX. A transfer direction switch indication circuit 57 indicates the transfer direction switch circuit 58 to switch the transfer direction.

FIG. 3 shows the target-side transceiver 40 and link controller 300. The configurations and operations of circuits 70, 72, 74, 75, 76, 77, 78, 79, 80, 81, 82, 83, 84, 85, 86, 87, and 88 shown in FIG. 3 are almost the same as the configurations and operations of the circuits 50, 52, 54, 55, 56, 57, 58, 59, 60, 61, 62, 63, 64, 65, 66, 67, and 68 shown in FIG. 2. Therefore, description of these circuits is omitted. A strobe control circuit 16 (frequency divider circuit) receives the clock signal received by the circuit CLKRX, performs strobe control such as frequency division of the clock signal, and outputs the strobe signal to the circuit STBTX. A frequency divider circuit 18 receives the clock signal received by the circuit CLKRX, and supplies the frequency-divided clock signal to the circuit blocks in the transceiver 40 and the link controller 300. A transmitter circuit TTX is used when performing half-duplex transfer using the data DTO+ and DTO−. In more detail, the transmitter circuit TTX transmits data by driving the DTO+ and DTO− serial signal lines when the transfer direction is changed during half-duplex transfer. In this case, the transfer direction switch circuit 78 switches the transfer direction, and the transfer direction switch indication circuit 77 indicates switching of the transfer direction.

4. 8B/10B Code

In the 8B/10B encoding, 256 types of 8-bit data are encoded into 256 types of 10-bit data. This encoding enables DC components to be balanced by setting the ratio of "1" to "0" of 10-bit data to 4:6, 5:5, and 6:4. In more detail, the 8B/10B encoding defines 8-bit data as A, B, C, D, E, F, G and H from the LSB to the MSB. In the encode processing, 8-bit data is separated into an ABCDE (5-bit) data block x (decimal notation) and an FGH (3-bit) data block y (decimal notation). The separated data blocks are translated into a character code called a D code Dxy. The ABCDE block is converted to abcdei (6 bits) by 5B/6B encoding. The FGH block is converted to fghj (4 bits) by 3B/4B encoding. 10-bit encoded data is obtained by combining abcdei and fghj.

According to the 8B/10B encoding, a change in bit of a signal is increased after encoding even in data continuously containing "0" or "1", whereby occurrence of a transfer error due to noise or the like can be reduced. According to the 8B/10B encoding, since the bit width is expanded from 8 bits to 10 bits, the special code (control code) shown in FIG. 4 can be generated in addition to data.

In this embodiment, the preamble code, stop code, direction code (transfer direction switch request code), or the like is assigned to the special code obtained by the 8B/10B encoding (encoding which expands the bit width), and is transferred through the data transfer serial signal lines (DTO). In FIG. 4, codes K28.1, K28.2, K28.3, K28.4, K28.5, K28.6, and K28.7 are respectively assigned to the preamble code, stop code, abort code, division code (multi channel division transfer code), data power down code, direction code (transfer direction switch request code), and all power down code, and are transferred through the data transfer serial signal lines, for example. As a result, the receiver side detects the direction code and the like by detecting the codes K28.1 to K28.7 by performing decode processing in the 8B/10B encoding method.

As shown in FIG. 4, each code consists of a positive code (positive symbol code) and a negative code (negative symbol code). The negative code is a code obtained by reversing each bit of the positive code.

In the 8B/10B encoding, 8-bit data is converted to 10-bit positive code data and negative code data and alternately transmitted. This enables the receiver end to predict the disparity of the next data in 10 bit units, whereby an error in the transmission line can be detected.

5. Half-Duplex Transfer

The half-duplex transfer method in this embodiment is described below. Since it suffices that full-duplex transfer be not performed when half-duplex transfer can be implemented, the configurations of the full-duplex transfer receiver circuits INRX and STBRX shown in FIG. 2 and the full-duplex transfer transmitter circuits INTX and STBTX shown in FIG. 3 may be omitted.

An outline of the half-duplex transfer method in this embodiment is described below using FIGS. 5A and 5B. FIG.

5A shows an outline of the half-duplex transfer method during normal transfer. As indicated by (1) shown in FIG. 5A, the host (first data transfer control device in a broad sense) switches the transfer direction from the transmission direction to the reception direction. In more detail, the transfer direction switch indication circuit 57 shown in FIG. 2 indicates the transfer direction switch circuit 58 to switch the transfer direction. The transfer direction switch circuit 58 switches from the transmitter circuit OUTTX to the half-duplex transfer receiver circuit HRX. Specifically, when the transfer direction is the forward direction (transmission direction), the transfer direction switch circuit 58 enables the circuit OUTTX and disables the circuit HRX. When the transfer direction is switched to the reverse direction (reception direction), the transfer direction switch circuit 58 disables the circuit OUTTX and enables the circuit HRX.

After the host (first data transfer control device in a broad sense) has switched the transfer direction from the transmission direction to the reception direction, the target (second data transfer control device in a broad sense) switches the transfer direction from the reception direction to the transmission direction as indicated by (2) shown in FIG. 5A. In more detail, the transfer direction switch indication circuit 77 shown in FIG. 3 indicates the transfer direction switch circuit 78 to switch the transfer direction. The transfer direction switch circuit 78 switches from the receiver circuit OUTRX to the half-duplex transfer transmitter circuit TTX. Specifically, when the transfer direction is the forward direction (reception direction), the transfer direction switch circuit 78 enables the circuit OUTRX and disables the circuit TTX. When the transfer direction is switched to the reverse direction (transmission direction), the transfer direction switch circuit 78 disables the circuit OUTRX and enables the circuit TTX.

As indicated by (3) shown in FIG. 5A, the target starts transfer in the reverse direction. Specifically, the transmitter circuit TTX of the target transmits data to the host by current-driving the serial signal lines. As indicated by (4) shown in FIG. 5A, the host performs reception in the reverse direction. Specifically, the receiver circuit HRX of the host receives data transferred from the circuit TTX by detecting the current flowing through the serial signal lines (by converting current to voltage).

FIG. 5B shows an outline of the half-duplex transfer method in this embodiment at the time of reception failure. As indicated by (1) shown in FIG. 5B, the host (first data transfer control device) switches the transfer direction from the transmission direction to the reception direction. In this embodiment, the target (second data transfer control device) does not switch the transfer direction from the reception direction to the transmission direction when a reception error has occurred. Specifically, the target cancels switching of the transfer direction from the reception direction to the transmission direction which should be performed in response to the transfer direction switch request from the host, and does not switch from the receiver circuit OUTRX to the transmitter circuit TTX. In more detail, when a reception error has occurred at the time of or before detection of the transfer direction switch request from the host to the target (at the time of or before detection of the transfer direction switch request code), the target cancels switching of the transfer direction from the reception direction to the transmission direction. As examples of such a reception error, a preamble error, a decode error, and the like can be given.

As indicated by (2) shown in FIG. 5B, when a response (response packet) has not been returned from the target when a predetermined period of time has elapsed after the completion of transmission and a timeout has occurred, the host reverses the transfer direction from the reception direction to the transmission direction and retransmits the data. The host then switches the transfer direction from the transmission direction to the reception direction.

As indicated by (3) shown in FIG. 5B, upon success in receiving using the receiver circuit OUTRX, the target switches the transfer direction from the reception direction to the transmission direction.

When a CRC error which is found after detection of the transfer direction switch request or the like has occurred, the target normally switches the transfer direction from the reception direction to the transmission direction according to the transfer direction switch request from the host. The target transmits a packet indicating the CRC error to the host, and reverses the transfer direction from the transmission direction to the reception direction after transmission of the packet has been completed. Upon receiving the packet indicating the CRC error from the target, the host reverses the transfer direction from the reception direction to the transmission direction.

In current-drive serial transfer, it is desirable to prevent the transmitter circuit of the host and the transmitter circuit of the target from being connected with a single serial signal line. If such a situation occurs, since the two transmitter circuits perform a current drive which causes current to flow toward VSS, the potential of the serial signal line is decreased to 0 V, whereby a long period of time is required for recovery of the normal state. If the receiver circuit of the host and the receiver circuit of the target are connected with a single serial signal line, the voltage of the serial signal line is maintained at a DC bias voltage of about 1 V by DC bias circuits included in the receiver circuits. Therefore, the analog circuits can return to the normal state in a short period of time.

In the half-duplex transfer method in this embodiment shown in FIG. 5A, the host switches from the transmitter circuit OUTTX to the receiver circuit HRX, and the target then switches from the receiver circuit OUTRX to the transmitter circuit TTX. Therefore, the transmitter circuits OUTTX and TTX can be prevented from being connected with the DTO+/− serial signal lines at the same time at the switch timing of the transfer direction. The receiver circuits HRX and OUTRX are connected with the DTO+/− serial signal lines at the switch timing of the transfer direction. Therefore, since the voltage of the serial signal lines is maintained at a DC bias voltage of about 1 V by the DC bias circuits included in the receiver circuits HRX and OUTRX, the analog circuits can return to the normal state in a short period of time.

In this embodiment, the target does not switch from the receiver circuit OUTRX to the transmitter circuit TTX when a reception error has occurred, as shown in FIG. 5B. Therefore, even when the host has switched from the receiver circuit HRX to the transmitter circuit OUTTX due to occurrence of a timeout, the transmitter circuit OUTTX and the transmitter circuit TTX can be prevented from being connected with the DTO+/− serial signal lines at the same time. Therefore, since the receiver circuit HRX of the host and the receiver circuit OUTRX of the target are reliably connected with the serial signal lines even when a reception error has occurred, the analog circuits can return to the normal state in a short period of time.

Figure 6A:
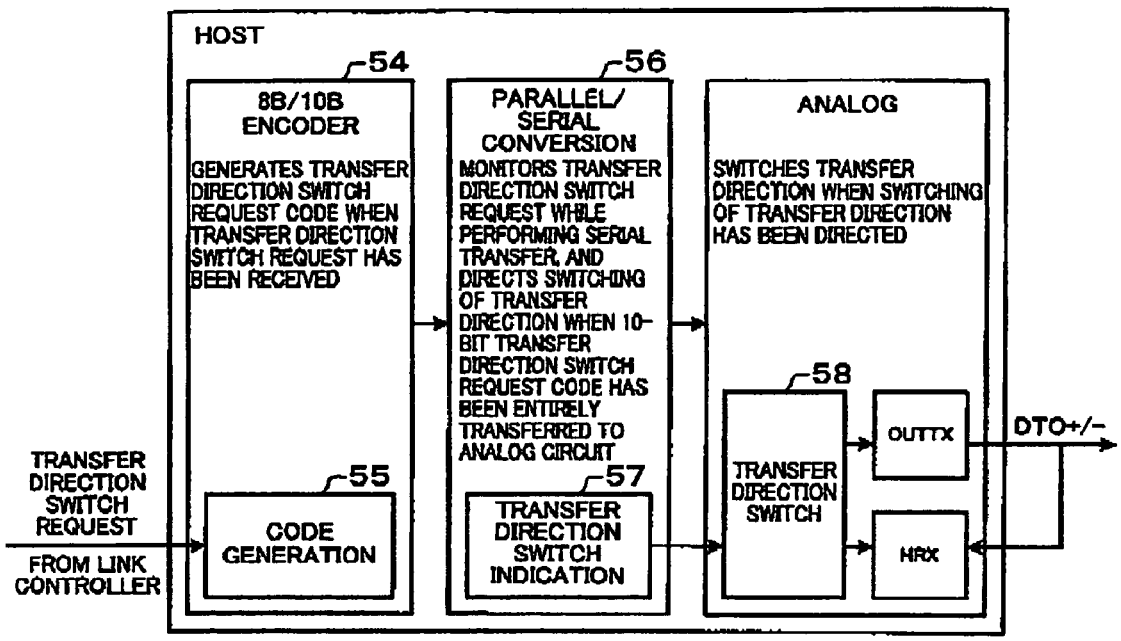
FIGS. 6A and 6B are illustrative of a half-duplex transfer method in this embodiment in detail.

The details of the half-duplex transfer method in this embodiment are described below using FIGS. 6A and 6B. As shown in FIG. 6A, a transfer direction switch request is transmitted from the link controller 20 (upper layer circuit) of the host. The code generation circuit 55 of the 8B/10B encoder circuit 54 generates a transfer direction switch request code.

In more detail, in this embodiment, the encoder circuit 54 encodes data using the 8B/10B encoding method (encoding method which expands N bits of data to M bits of data in a broad sense). The code generation circuit 55 generates the special code assigned to the transfer direction switch request code among the special codes specified by the 8B/10B encoding method. Specifically, the Direction code which is the transfer direction switch request code is assigned to the 8B/10B special code K28.6 in FIG. 4. The code generation circuit 55 receives the special code generation direction signal (TxCode) from the link controller 200 (upper layer circuit), and generates the transfer direction switch request code when generation of the transfer direction switch request code (Direction code) has been directed by the special code generation direction signal, as described later. The transfer direction switch request from the link controller 200 is accepted in this manner.

The parallel/serial conversion circuit 56 monitors the transfer direction switch request while performing serial transfer (parallel/serial conversion). When the 10-bit transfer direction switch request code has been entirely transferred to the analog circuit, the transfer direction switch indication circuit 57 indicates the transfer direction switch circuit 58 to switch the transfer direction. Specifically, the transmitter circuit OUTTX, which is an analog circuit, transmits the transfer direction switch request code (Direction code) to the target through the serial signal lines, and then directs switching of the transfer direction. When switching of the transfer direction has been directed, the transfer direction switch circuit 58 switches the transfer direction from the transmission direction to the reception direction. Specifically, the transfer direction switch circuit 58 switches from the transmitter circuit OUTTX to the receiver circuit HRX.

As described above, in this embodiment, when the transfer direction switch request has been transmitted from the link controller 200 (upper layer circuit), the transmitter circuit OUTTX transmits the transfer direction switch request code generated by the code generation circuit 55 to the host (partner-side data transfer control device) through the serial signal lines. After the transfer direction switch request code has been transmitted, the transfer direction switch indication circuit 57 indicates the transfer direction switch circuit 58 to switch the transfer direction from the transmission direction to the reception direction.

Figure 6B:
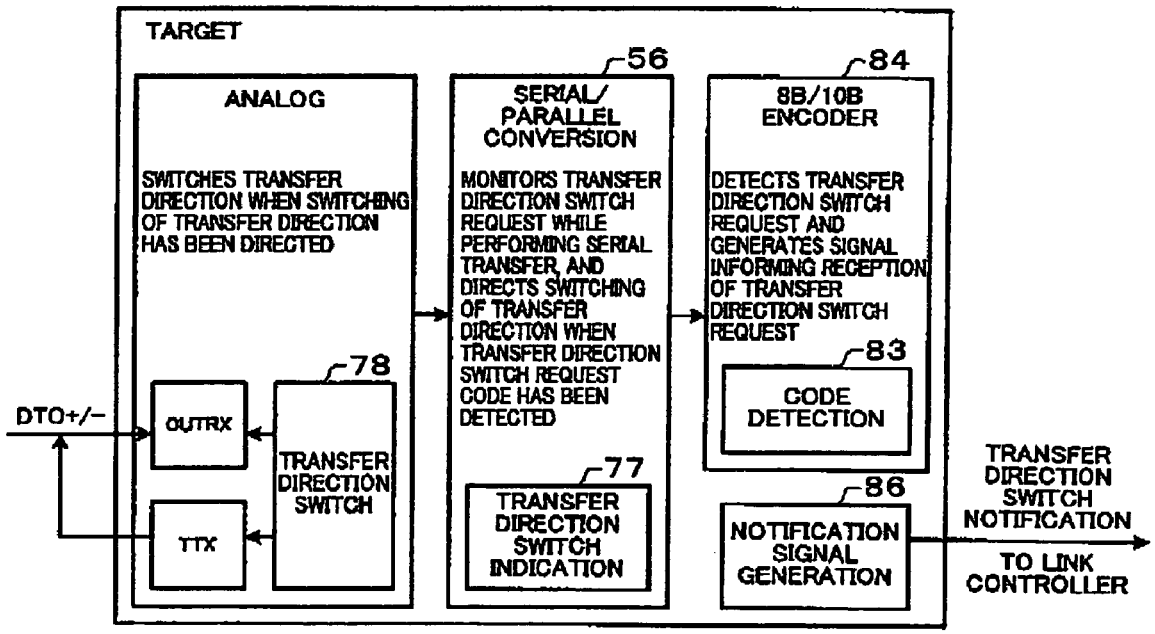

As shown in FIG. 6B, the serial/parallel conversion circuit 80 of the target monitors the transfer direction switch request from the host while performing serial reception (serial/parallel conversion). When the transfer direction switch request code has been detected by the code detection circuit 83, the transfer direction switch indication circuit 77 indicates the transfer direction switch circuit 78 to switch the transfer direction. When switching of the transfer direction has been indicated, the transfer direction switch circuit 78 switches the transfer direction from the reception direction to the transmission direction. Specifically, the transfer direction switch circuit 78 switches from the receiver circuit OUTRX to the transmitter circuit TTX.

When the code detection circuit 83 has detected the transfer direction switch request code, the notification signal generation circuit 86 generates a signal (DIR) indicating reception of the transfer direction switch request and outputs the signal to the link controller 300.

In more detail, in this embodiment, the decoder circuit 84 receives the parallel data from the serial/parallel conversion circuit 80, and performs decoding processing of the data and the special code encoded using the 8B/10B encoding method. The code detection circuit 83 detects the transfer direction switch request code by detecting the special code assigned to the transfer direction switch request code (K28.6 shown in FIG. 4) among the special codes specified by the 8B/10B encoding method. As described above, when a reception error has been detected at the time of or before code detection of the code detection circuit 83, the transfer direction switch indication circuit 77 cancels the switch indication of the transfer direction from the reception direction to the transmission direction.

As described above, in this embodiment, when the transfer direction switch request code has been detected by the code detection circuit 83, the transfer direction switch indication circuit 77 indicates the transfer direction switch circuit 78 to switch the transfer direction from the reception direction to the transmission direction. The notification signal generation circuit 86 generates a signal which indicates that the transfer direction switch request has been transmitted from the host (partner-side data transfer control device), and outputs the signal to the link controller 300 (upper layer circuit). This enables the link controller 300 to determine that the transfer direction switch request has been issued from the host, whereby the subsequent processing can be performed.

As described with reference to FIGS. 6A and 6B, in this embodiment, the target is notified of the transfer direction switch request from the host by transmitting the transfer direction switch request code from the host to the target. The host switches from the transmitter circuit OUTTX to the receiver circuit HRX after transmitting the transfer direction switch request code. The target switches from the receiver circuit OUTRX to the transmitter circuit TTX after detecting the transfer direction switch request code. In this case, a certain period of time is required for transferring the transfer direction switch request code through the serial signal lines. Therefore, since the receiver circuit HRX of the host and the receiver circuit OUTRX of the target are connected with the serial signal lines in the period of time when switching the transfer direction, the voltage of the serial signal lines can be maintained at a voltage of 1 V, for example, whereby the analog circuits can return to the normal state in a short period of time.

6. Data Transfer Format

Figure 7:
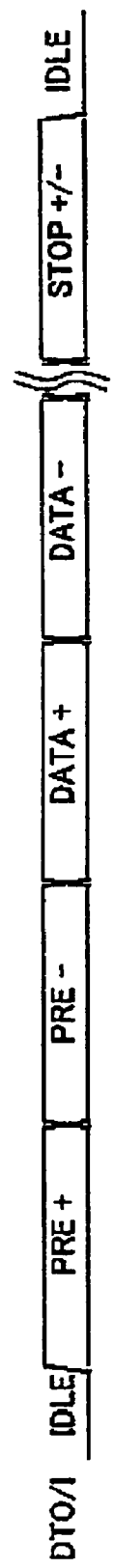
FIG. 7 shows a data transfer format example in a normal transfer method.

FIG. 7 shows a data transfer format in the normal transfer method. In FIG. 7, a state in which data is not transferred through the serial signal lines is the idle state. In this embodiment, a state (signal) in which the logical level of the serial signal lines is continuously fixed at a first logical level ("0", for example) in units of a given number of bits (M bits) or more is defined as the idle state (idle signal). In more detail, a state (signal) in which a differential signal of "0" is continuously output in units of 10 bits (M bits) or more is defined as the idle state (idle signal). A differential signal of "0" used herein means a state in which the amount of current flowing through the signal line (DTO− or DTI−) of the negative-side differential signal is greater than the amount of current flowing through the signal line (DTO+ or DTI+) of the positive-side differential signal. A differential signal of "1" means a state in which the amount of current flowing through the signal line of the positive-side differential signal is greater than the amount of current flowing through the signal line of the negative-side differential signal.

In this embodiment, as shown in FIG. 7, an idle signal IDLE and two preamble codes are inserted between packets when performing packet transfer. In more detail, the transmitter side outputs the idle signal IDLE consisting of a differential signal of "0" to the serial signal lines, and transmits a positive (first polarity in a broad sense) preamble code PRE+ and a negative (second polarity in a broad sense) preamble code PRE– through the serial signal lines. This enables the receiver side to acquire synchronization of a packet by detecting the preamble code. The transmitter side then transmits 8B/10B encoded positive code data DATA+ and negative code data DATA–, and transmits stop codes STOP+/–. The transmitter side then outputs the idle signal IDLE again.

In this embodiment, the idle signal consisting of a differential signal of "0" (may be "1") is output in the idle period instead of outputting the idle code. Therefore, the operations of the encoder circuit (code generation circuit), the parallel/serial conversion circuit, the serial/parallel conversion circuit, and the decoder circuit (code detection circuit) can be suspended. Therefore, an unnecessary current can be effectively prevented from flowing through the logic circuit in the idle period, whereby a reduction of power consumption can be achieved. This reduces the amount of current flowing through a portable information instrument such as a portable telephone during standby.

In this embodiment, only the negative (second polarity) preamble code PRE– is detected ignoring the positive (first polarity) preamble code PRE+. A preamble error is indicated by activating a preamble error notification signal on condition that the preamble code PRE– has not been detected (on condition that the preamble code PRE– has not been detected one or more times).

A preamble error is not detected even when the change in data from "0" to "1" at the first bit of the preamble code PRE+ cannot be detected by detecting only the preamble code PRE–, since the preamble code PRE+ is ignored. Therefore, a problem in which a preamble error is indicated by mistake can be prevented.

Figure 8:
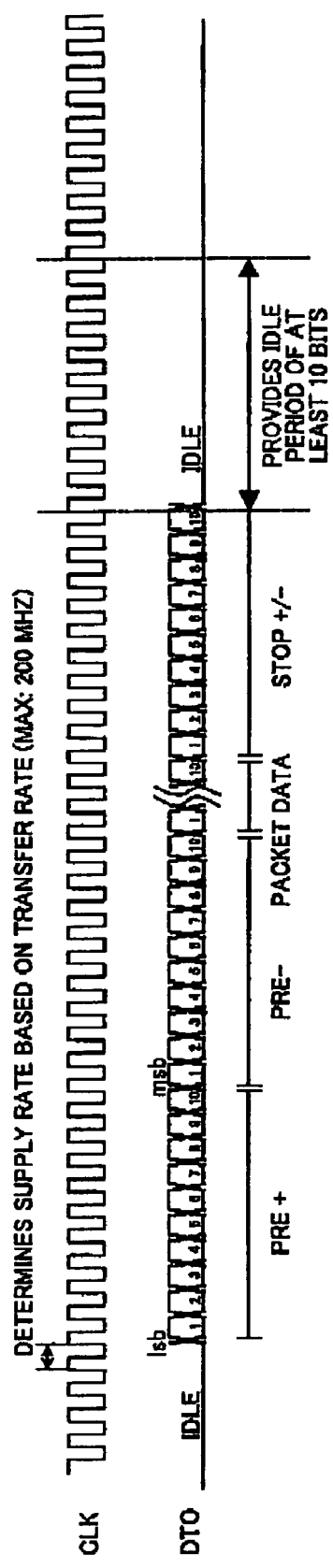
FIG. 8 shows a signal waveform example when the host transmits data to the target in the normal transfer method.
Figure 9:
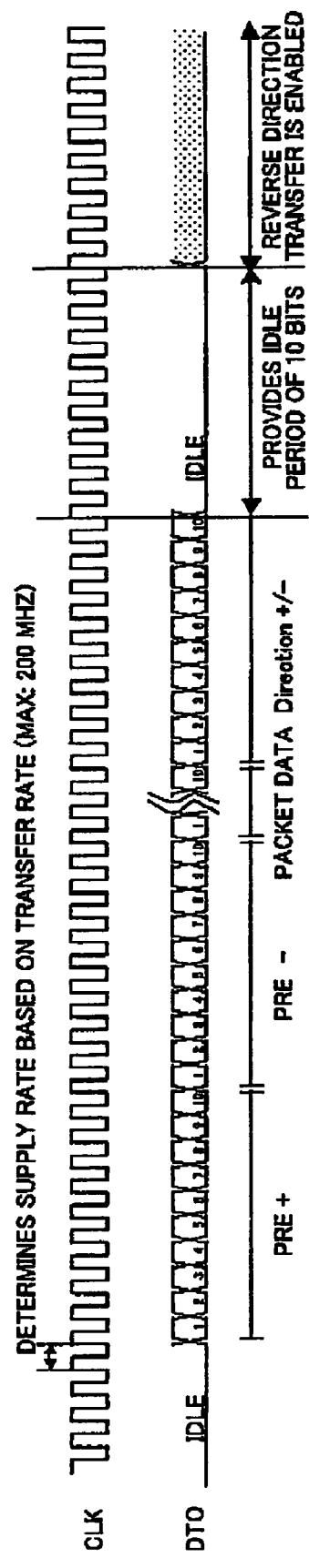
FIG. 9 shows a signal waveform example when the host transmits data to the target in the half-duplex transfer method in this embodiment.
Figure 10:
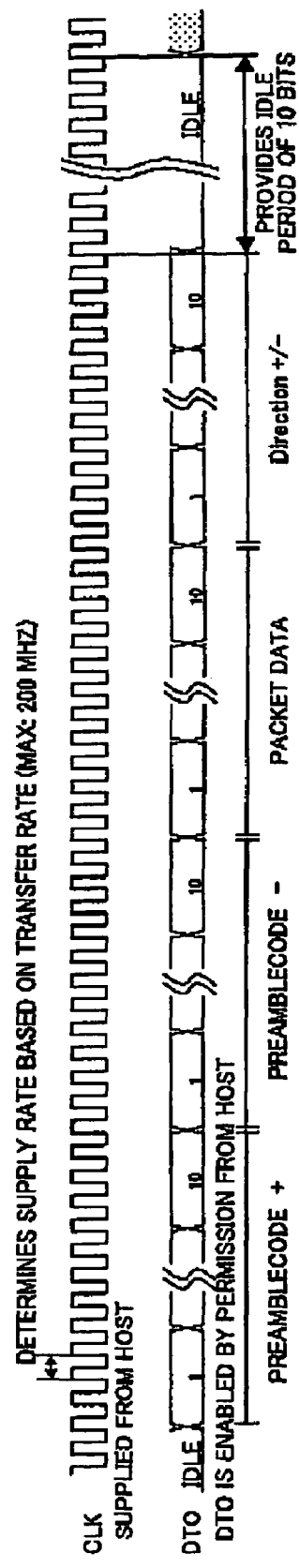
FIG. 10 shows a signal waveform example when the target transmits data to the host in the half-duplex transfer method.

FIG. 8 shows a signal waveform example when the host transmits data to the target in the normal transfer method. FIG. 9 shows a signal waveform example when the host transmits data to the target in the half-duplex transfer method in this embodiment, and FIG. 10 shows a signal waveform example when the target transmits data to the host in the half-duplex transfer method.

As shown in FIG. 8, in the normal transfer method, the host (OUTTX) transmits the stop code (STOP) in addition to the data of the packet transmitted through the serial signal lines. In the half-duplex transfer method shown in FIG. 9, the host (OUTTX) transmits the transfer direction switch request code (Direction) in addition to the data of the packet transmitted through the serial signal lines (after transmitting the data of the packet). This enables the host to receive data in the next transaction after transmitting data by switching the transfer direction from the transmission direction to the reception direction, for example.

After transmitting the transfer direction switch request code (Direction) through the serial signal lines, the host (OUTTX) outputs the idle signal consisting of a differential signal of "0". Specifically, the host outputs the idle signal, logical level of which is continuously fixed at the first logical level ("0") in units of 10 bits (M bits) or more to the serial signal lines.

The host switches the transfer direction from the transmission direction to the reception direction when outputting the 10-bit idle signal IDLE. This enables transfer in the reverse direction. The target switches the transfer direction from the reception direction to the transmission direction when the target has detected one (10-bit) idle signal IDLE after detecting the transfer direction switch request code (Direction). This prevents the circuits OUTTX and TTX from being connected with the serial signal lines at the same time at the switch timing of the transfer direction.

When a reception error has occurred on the target side after the host has transmitted the transfer direction switch request code (Direction), switching of the transfer direction is inhibited on the target side, as described above. This makes it unnecessary for the host to transmit the transfer direction switch request code for reversing the transfer direction, whereby the processing can be simplified.

As is clear from comparison between FIG. 9 and FIG. 10, in the half-duplex transfer in this embodiment, the transfer rate of data transfer from the host to the target (forward direction) is as high as 200 Mbps, for example. On the other hand, the transfer rate of data transfer from the target to the host (reverse direction) is as low as 50 Mbps, for example.

7. Transmitter Circuit, Receiver Circuit, and Transfer Direction Switch Circuit

Figure 11:
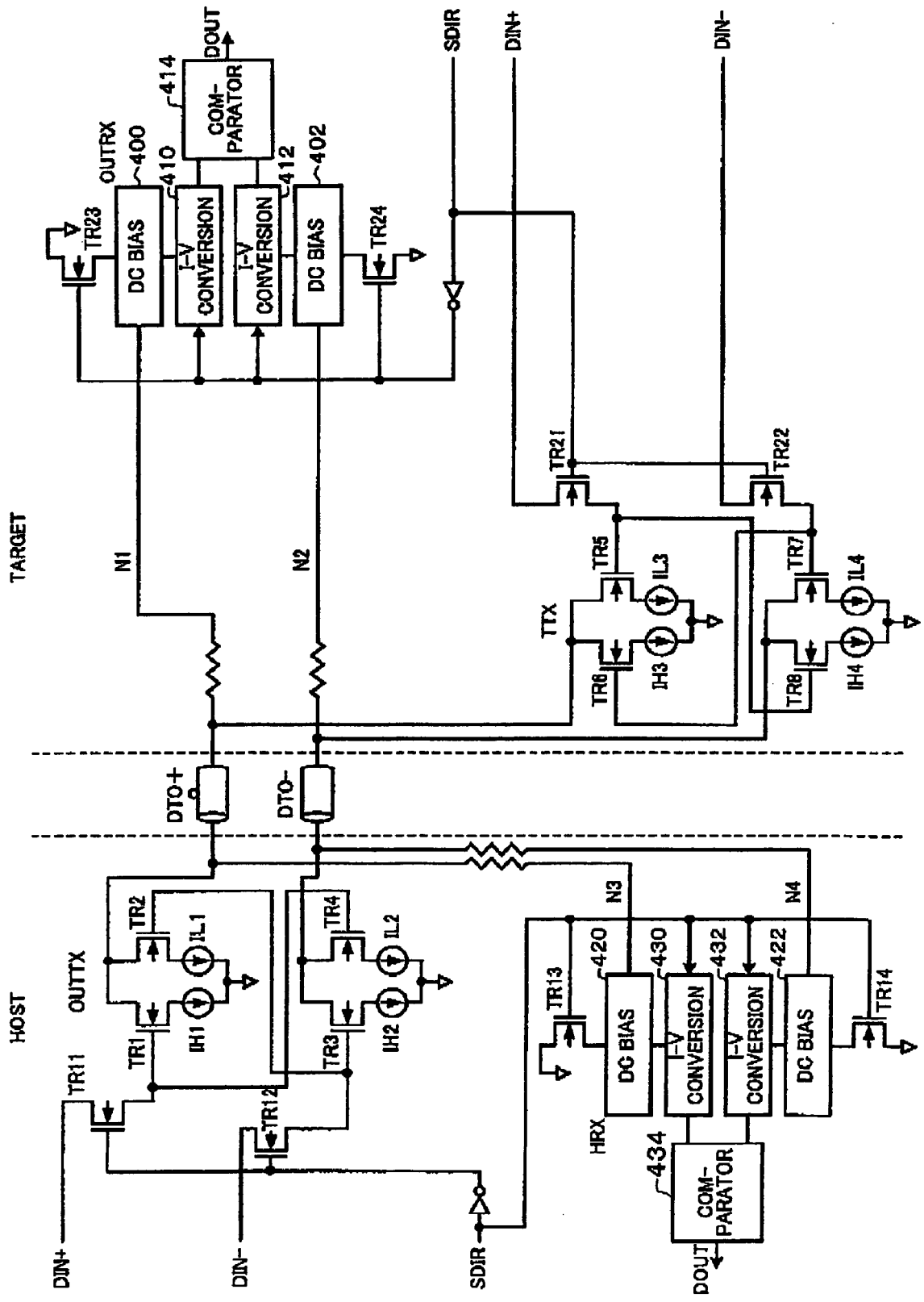
FIG. 11 shows the transmitter circuit, the receiver circuit, and the transfer direction switch circuit. However, each circuit in this embodiment is not limited thereto.

FIG. 11 shows the transmitter circuit, the receiver circuit, and the transfer direction switch circuit. However, each circuit in this embodiment is not limited thereto.

As shown in FIG. 11, the host-side transmitter circuit OUTTX includes N-type (first conductivity type in a broad sense; hereinafter the same) transistors TR1, TR2, TR3, and TR4, and current sources IH1, IL1, IL2, and IH2. The current sources IH1 and IH2 can cause a larger amount of current in comparison with the current sources IL1 and IL2.

A drain of the transistor TR1 is connected with the DTO+ signal line, the input signal DIN+ is input to a gate of the transistor TR1 through a transistor TR11, and the current source IH1 is connected with a source of the transistor TR1. A drain of the transistor TR2 is connected with the DTO+ signal line, the input signal DIN– is input to a gate of the transistor TR2 through a transistor TR12, and the current source IL1 is connected with a source of the transistor TR2. A drain of the transistor TR3 is connected with the DTO– signal line, the input signal DIN– is input to a gate of the transistor TR3 through the transistor TR12, and the current source IH2 is connected with a source of the transistor TR3. A drain of the transistor TR4 is connected with the DTO– signal line, the input signal DIN+ is input to a gate of the transistor TR4 through the transistor TR11, and the current source IL2 is connected with a source of the transistor TR4.

Suppose that the transistors TR11 and TR12 are in the ON state. When the input signal DIN+ is at the H level ("1") and the input signal DIN– is at the L level ("0"), the transistors TR1 and TR4 are turned ON and the transistors TR2 and TR3 are turned OFF. Therefore, a large amount of current flows through the DTO+ signal line from the current source IH1, and a small amount of current flows through the DTO– signal line from the current source IL2. When the input signal DIN+ is at the L level and the input signal DIN– is at the H level, the transistors TR2 and TR3 are turned ON and the transistors TR1 and TR4 are turned OFF. Therefore, a small amount of current flows through the DTO+ signal line from the current source IL1, and a large amount of current flows through the DTO– signal line from the current source IH2. This enables the serial signal lines to be current-driven.

The target-side receiver circuit OUTRX includes DC bias circuits 400 and 402, I-V conversion circuits 410 and 412, and a comparator 414. The DC bias circuits 400 and 402 generate a DC bias voltage of about 1 V at differential signal input nodes N1 and N2. The I-V conversion circuits 410 and 412 respectively convert the current flowing through the DTO+ and DTO– signal lines to voltage. In this case, the current-voltage conversion performed by the I-V conversion circuits 410 and 412 can be increased in speed by generating the DC bias voltage using the DC bias circuits 400 and 402. The comparator 414 compares first and second voltages generated by the current-voltage conversions performed by the I-V conversion circuits 410 and 412, and outputs the comparison result as a signal DOUT.

The configuration of the target-side transmitter circuit TTX is almost the same as the configuration of the host-side transmitter circuit OUTTX, and the configuration of the host-side receiver circuit HRX is almost the same as the configuration of the target-side receiver circuit OUTRX. Therefore, description of these circuits is omitted.

The host-side transfer direction switch circuit 58 shown in FIG. 2 includes N-type (first conductivity type) transistors TR11, TR12, TR13, and TR14 as shown in FIG. 11. The target-side transfer direction switch circuit 78 shown in FIG. 3 includes N-type transistors TR21, TR22, TR23, and TR24.

When the host-side transfer direction switch indication signal SDIR has been set at the L level, the transistors TR11 and TR12 are turned ON, whereby the input signals DIN+ and DIN− are input to the transistors TR1, TR2, TR3, and TR4. Specifically, the transmitter circuit OUTTX is enabled. When the direction signal SDIR has been set at the L level, the transistors TR13 and TR14 are turned OFF, whereby the DC bias circuits 420 and 422 are disabled. The I-V conversion circuits 430 and 432 are also disabled. Therefore, the receiver circuit HRX is disabled. This causes the transfer direction to be set in the transmission direction.

When the host-side direction signal SDIR has been set at the H level, the transmitter circuit OUTTX is disabled and the receiver circuit HRX is enabled, differing from the case of the L level, whereby the transfer direction is set to the reception direction.

When the host-side direction signal SDIR has been set at the L level, the receiver circuit HRX is enabled, and the transmitter circuit TTX is disabled. Therefore, the transfer direction is set to the reception direction. When the direction signal SDIR has been set at the H level, the receiver circuit OUTRX is disabled, and the transmitter circuit TTX is enabled. Therefore, the transfer direction is set to the transmission direction. As described above, the transfer direction can be switched to an arbitrary direction by using the direction signal SDIR output from the transfer direction switch indication circuits 57 and 77.

8. PHY-LINK Interface Signal

Figure 12:
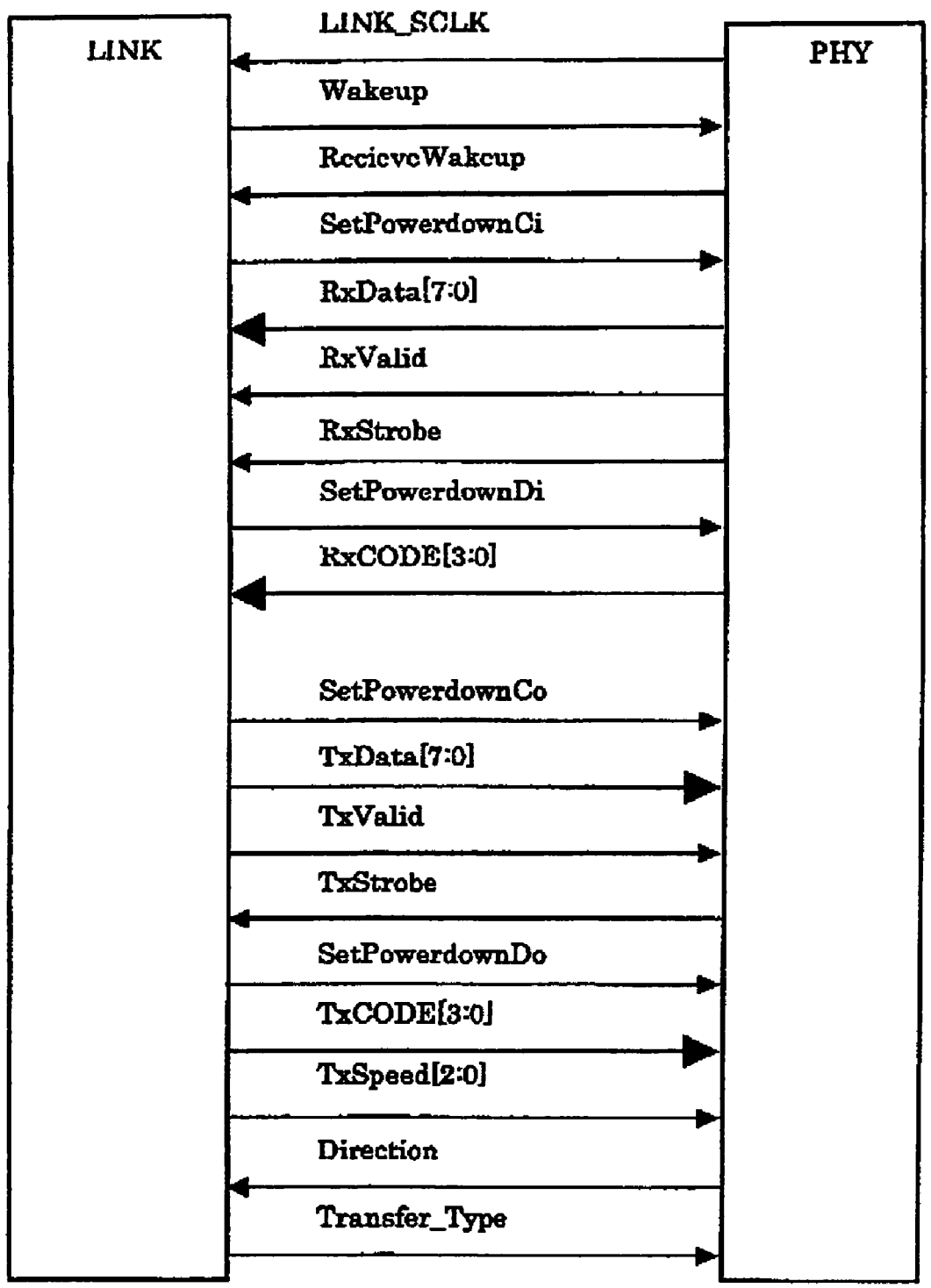
FIG. 12 shows an example of a PHY-LINK interface signal.

FIG. 12 shows an example of PHY-LINK (between the interface circuits 65 and 67 or between the interface circuits 85 and 87) interface signals in this embodiment. In FIG. 12, a signal LINK_SCLK is a system clock signal supplied to the LINK (link controller) from the PHY (transceiver). A signal Wakeup is a wakeup signal for the LINK to cancel the power down state. A signal ReceiveWakeup is a signal for the PHY to notify the LINK of reception of the signal Wakeup. A signal SetPowerdownCi is a signal for the LINK to request the PHY to set the CLK/STB receiver circuit in the power down state. Data RxData[7:0] is 8-bit parallel reception data which is generated by decoding reception data received through the serial signal lines using the 8B/10B encoding circuit and is output to the LINK from the PHY. The data RxData[7:0] is output to the LINK from the PHY together with a signal RxStrobe in synchronization with the signal LINK_SCLK.

A signal RxValid is a signal which indicates a period from the start to the end of a packet received through the serial signal lines and is asserted during a period in which data is present in the PHY. The signal RxStrobe is a data strobe signal supplied to the LINK from the PHY. The data RxData[7:0] is output in a period in which the signal RxStrobe is asserted. A signal SetPowerdownDi is a signal for the LINK to request the PHY to set the data reception receiver circuit in the power down state.

A signal RxCode[3:0] is a signal for the PHY to notify the LINK that the special code specified (defined) in the 8B/10B encoding method has been detected in the serial signal lines. The signal RxCode[3:0] is output to the LINK from the PHY together with the signal RxStrobe in synchronization with the signal LINK_SCLK. FIG. 13 shows an example of the RxCode value. The PHY must output "PREAMBLE detection" (RxCODE value=4) to the LINK when asserting the signal RxValid.

A signal SetPowerdownCo is a signal for the LINK to request the PHY to set the CLK/STB transmitter circuit in the power down state. Data TxData[7:0] is 8-bit parallel transmission data output to the serial signal lines. The LINK must hold the data TxData[7:0] and output it to the PHY until the PHY outputs the signal TxStrobe in synchronization with the signal LINK_SCLK.

The signal TxValid (transmission data valid/invalid signal) is a signal which indicates a period from the start to the end of a transmission packet and is a signal for the LINK to notify the PHY that the LINK has been prepared for transmission. The signal TxValid is asserted in a period in which transmission data is present in the LINK. The signal TxValid must be output in synchronization with the signal LINK_SCLK. A signal TxStrobe is a signal for the PHY to notify the LINK of completion of reception of data. The LINK must change the data TxData to the next data when the LINK has detected the signal TxStrobe. A signal SetPowerdownDo is a signal for the LINK to request the PHY to set the data transfer transmitter in the power down state.

A signal TxCode[3:0] is a signal for the LINK to request the PHY to transmit the special code specified by the 8B/10B encoding. FIG. 14 shows an example of the TxCode value. The LINK must output "PREAMBLE insertion" (TxCODE value=4) to the PHY when asserting the signal TxValid. The LINK must hold the signal TxCode[3:0] and output it to the PHY until the PHY outputs the signal TxStrobe in synchronization with the signal LINK_SCLK.

A signal TxSpeed[2:0] is a signal used when the target directs the transfer rate of transmission data. A signal Direction, which is a half-duplex communication exclusive signal, is a signal for the PHY to notify the LINK of the current transfer direction of the serial signal lines during half-duplex communication. For example, the LINK is notified that the transfer direction is a forward direction (transfer from the host to the target) when the Direction value is "0", and is notified that the transfer direction is a reverse direction (transfer from the target to the host) when the Direction value is "1". The LINK is inhibited from outputting a transfer request in the transfer direction opposite to the transfer direction indicated by the Direction value. A signal Transfer_Type is a signal for the LINK to notify the PHY of the supported communication method. A Transfer_Type value of "0" indicates that full-duplex communication is supported, and a Transfer_Type value of "1" indicates that half-duplex communication is supported.

Figure 15:
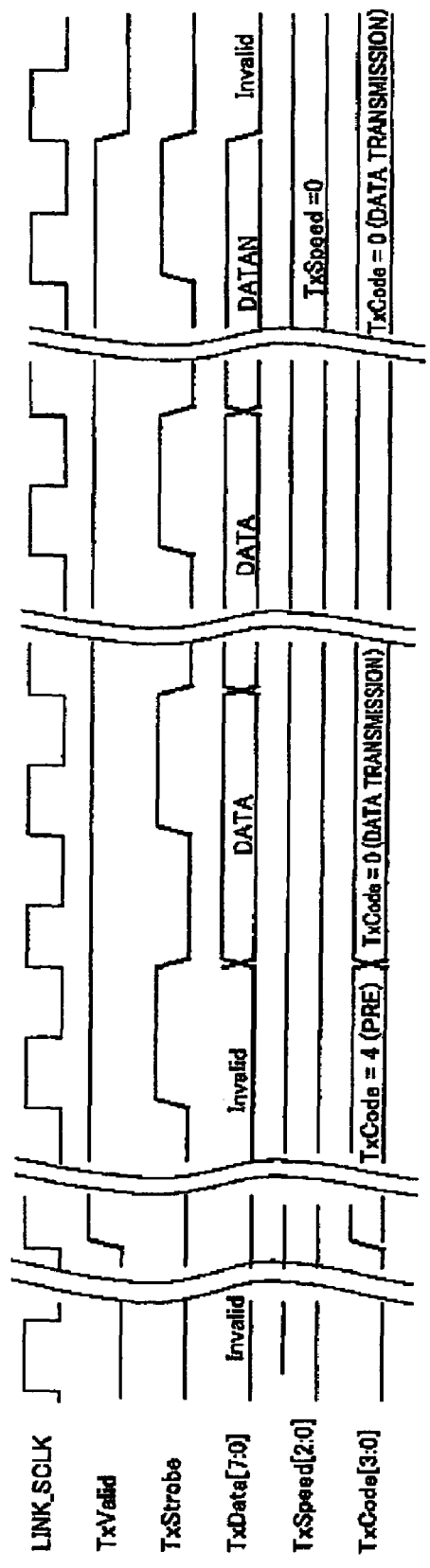
FIG. 15 shows a waveform example of a PHY-LINK interface signals in a normal transfer method.

FIG. 15 shows a waveform example of the PHY-LINK interface signals during data transmission in the normal transfer method. When the transmitter-side LINK transmits data through the serial signal lines, the LINK notifies the PHY that the LINK has been prepared for data transmission by asserting the signal TxValid. After asserting the signal TxValid, the LINK sets the value of the signal TxCode[3:0] shown in FIG. 14 to "4" to direct the PHY (8B/10B encoder circuit) to generate (output) the preamble code. The preamble code is a code assigned to the special code K28.1 of the 8B/10B code as shown in FIG. 4. When preparation for output of data to the serial signal line has been completed, the PHY asserts the signal TxStrobe for one clock signal period, whereby data transfer starts. The LINK sets the state in the data transfer state by setting the value of the signal TxCode[3:0] to "0" when the LINK has detected the signal TxStrobe, and outputs the transmission data TxData[7:0] to the PHY. When the LINK has detected the signal TxStrobe, the LINK changes the data TxData to the next data in synchronization with the signal LINK_SCLK. The LINK negates the signal TxValid in synchronization with the signal LINK_SCLK when the LINK has detected the signal TxStrobe for the final data to finish data transmission. As described above, the LINK drives the signals other than the signal TxStrobe during transfer shown in FIG. 15.

Figure 16:
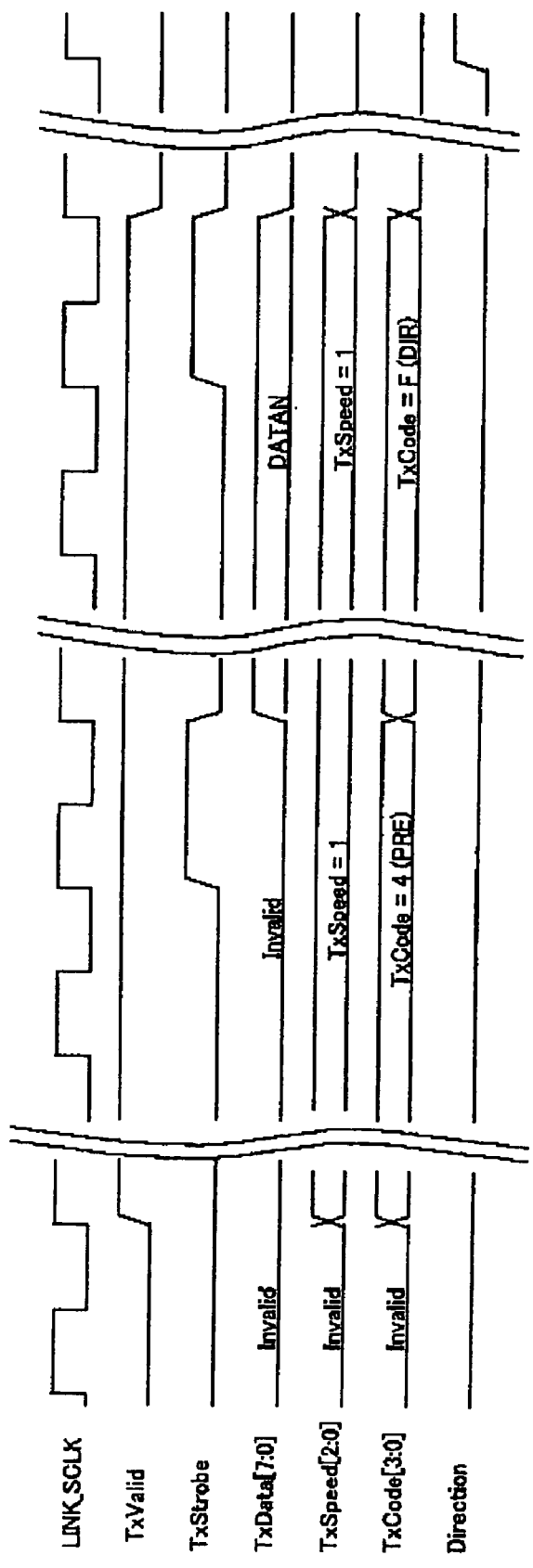
FIG. 16 shows a waveform example of a PHY-LINK interface signal in a half-duplex transfer method.

FIG. 16 shows a waveform example of the PHY-LINK interface signals during data transmission in the half-duplex transfer method. In FIG. 16, the LINK sets the value of TxCode[3:0] to "F" at the time of completion of data transmission differing from FIG. 15. A signal TxCode[3:0] of "F" is a signal for the LINK to request the PHY to switch the transfer direction as shown in FIG. 14.

As described above, in this embodiment, the code generation circuit 55 (8B/10B encoder circuit 54) of the PHY receives the special code generation direction signal TxCode[3:0] from the link controller 200 (upper layer circuit), and performs generation processing of the special code indicated by the signal TxCode[3:0]. In FIG. 16, the code generation circuit 55 outputs the signal TxCode[3:0] set to "F" at the time of completion of data transfer. The link controller 200 thus directs the code generation circuit 55 of the PHY to generate (output) the transfer direction switch request code (Direction) assigned to the special code K28.6. The processing and the configuration of the code generation circuit 55 can be simplified by directing generation of the special code using the signal TxCode[3:0], whereby a reduction of the circuit scale or the like can be achieved.

When notifying the LINK of the target that the transfer direction switch request has been transmitted from the host, the PHY sets the signal RxCode[3:0] shown in FIG. 13 to "F" and outputs it to the LINK. This enables the LINK of the target to determine that the transfer direction switch request has been issued from the host by using such a notification signal RxCode[3:0] set at "F", whereby the subsequent processing can be performed.

9. Packet Configuration

FIGS. 17A to 18B show format examples of packets transferred through the serial bus. The field configuration and the field arrangement of each packet are not limited to the examples shown in FIGS. 17A to 18B. Various modifications and variations may be made.

Figures 17A, 17B:
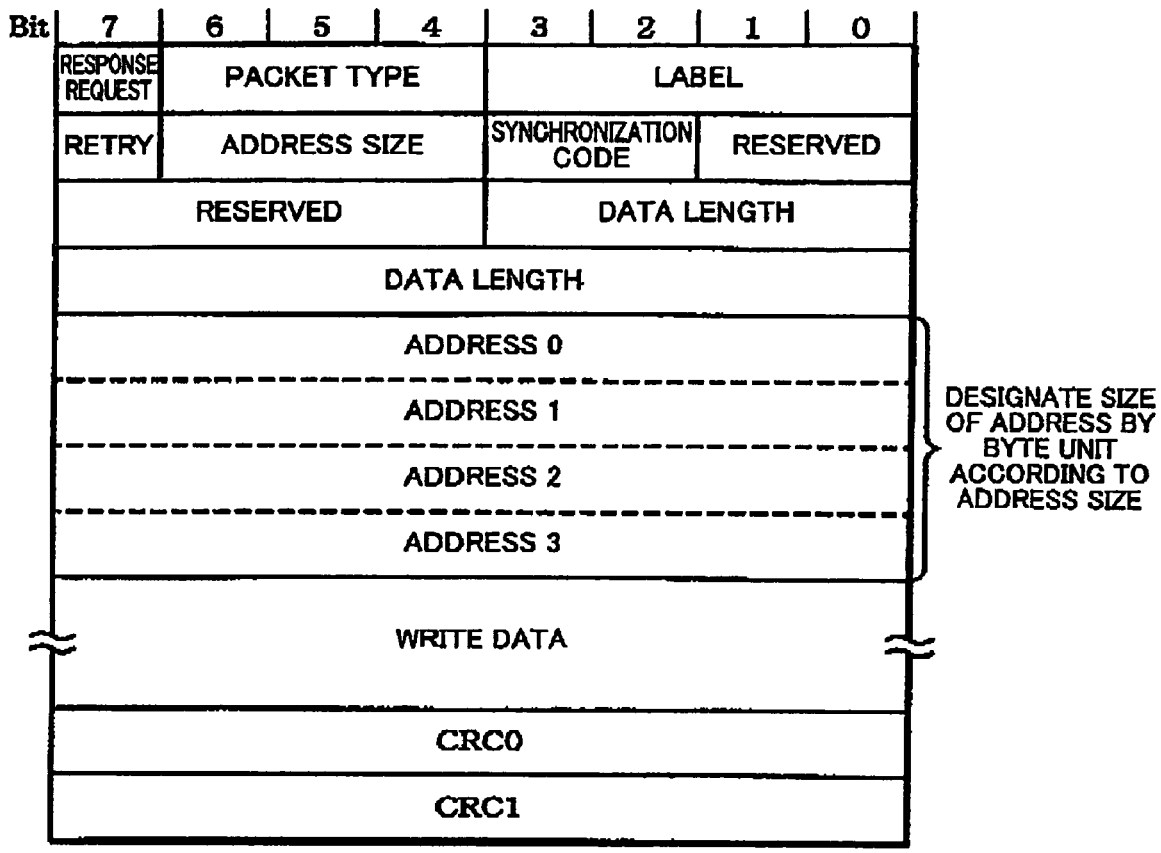
FIGS. 17A and 17B show format examples of packets.

A write request packet shown in FIG. 17A is a packet for requesting writing of data (including command). The write request packet includes a header field including response request, packet type, label, retry, address size, synchronization code, and data length fields, an address field for designating a write destination (access destination in a broad sense), a write data field, and a cyclic redundancy check (CRC) field.

An acknowledge packet (handshake packet) shown in FIG. 17B is a packet for transmitting acknowledgement (ACK) or negative acknowledgement (NACK). The acknowledge packet includes a header field including packet type, label, retry, and response code fields, and a CRC field.

Figure 18A:
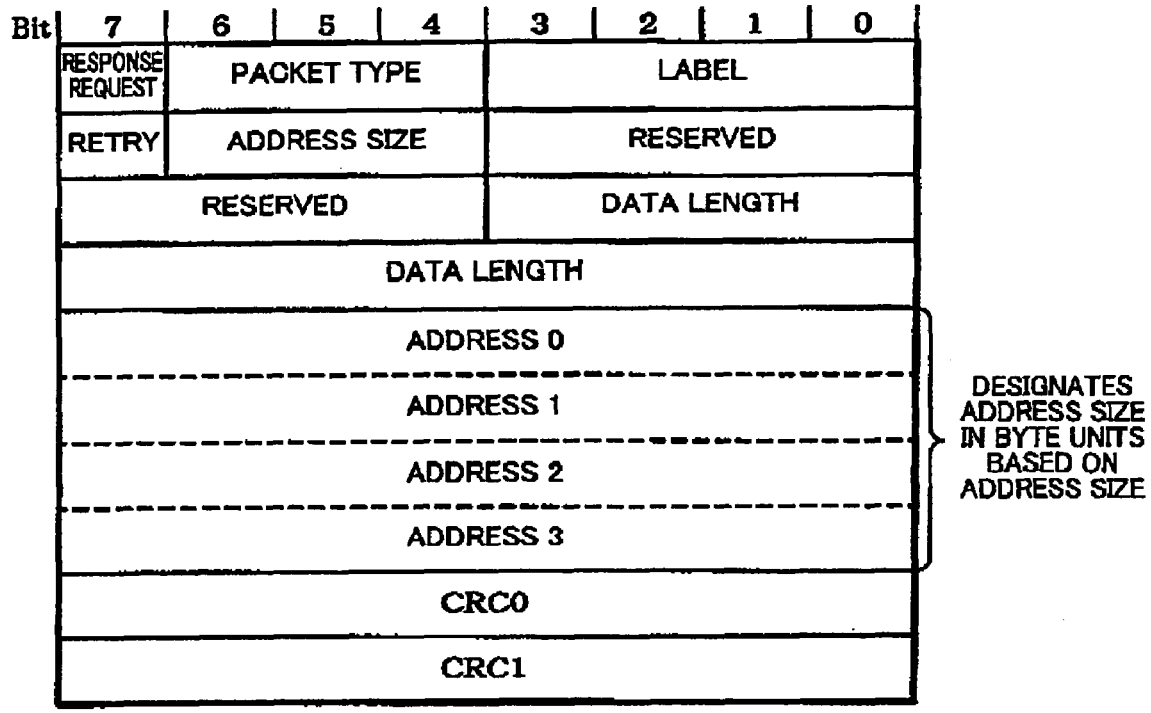
FIGS. 18A and 18B show format examples of packets.

A read request packet shown in FIG. 18A is a packet for requesting reading of data. The read request packet includes a header field including response request, packet type, label, retry, address size, and data length fields, an address field for designating a read destination (access destination in a broad sense), and a CRC field.

Figure 18B:
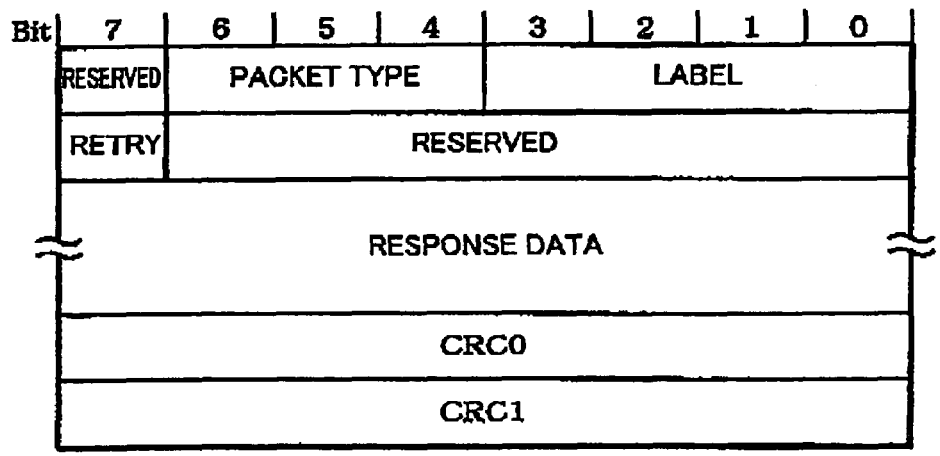

A response packet shown in FIG. 18B is a packet for responding to the read request packet, and includes a header field including packet type, label, and retry fields, a response data field, and a CRC field.

10. Transaction Example

Figure 19:
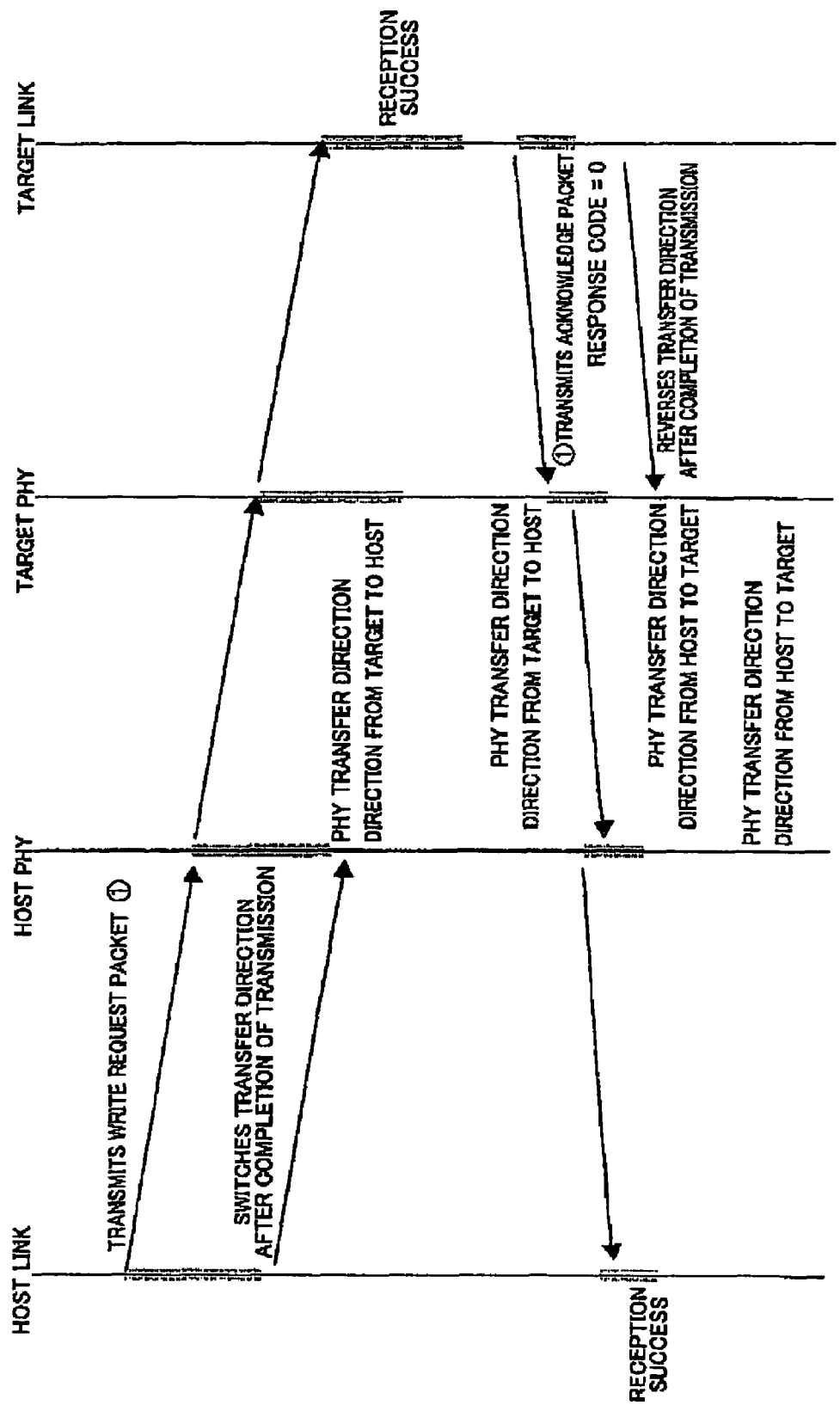
FIG. 19 is a success example of a command/data write transaction.

A transaction example in this embodiment is described below using FIGS. 19 to 22. FIG. 19 is a success example of a command/data write transaction in the half-duplex transfer method. The LINK of the host directs transmission of the write request packet shown in FIG. 17A for writing a command/data. In this case, the value of TxCode shown in FIG. 14 is set to "F". As a result, the PHY of the host switches the transfer direction from the transmission direction to the reception direction after transmission of the write request packet has been completed. When transmitting the write request packet, the transfer direction switch request code (Direction), which is the 8B/10B special code, is added after the packet data, as described with reference to FIG. 9.

When the LINK of the target, which has received the write request packet, has succeeded in reception, the LINK directs transmission of the acknowledge packet shown in FIG. 17B. In this case, a value of "0", which means reception success, is written into the response code field of the acknowledge packet. When the PHY of the target has detected the transfer direction switch request code (Direction), the PHY switches the transfer direction to the transmission direction (direction from the target to the host). The PHY of the target then transmits an acknowledge packet indicated by the LINK to the host. After completion of transmission of an acknowledge packet, the transfer direction is reversed from the transmission direction to the reception direction. After completion of reception of an acknowledge packet, the PHY of the host reverses the transfer direction from the reception direction to the transmission direction. The LINK of the host confirms reception success upon reception of the response code of the acknowledge packet.

Figure 20:
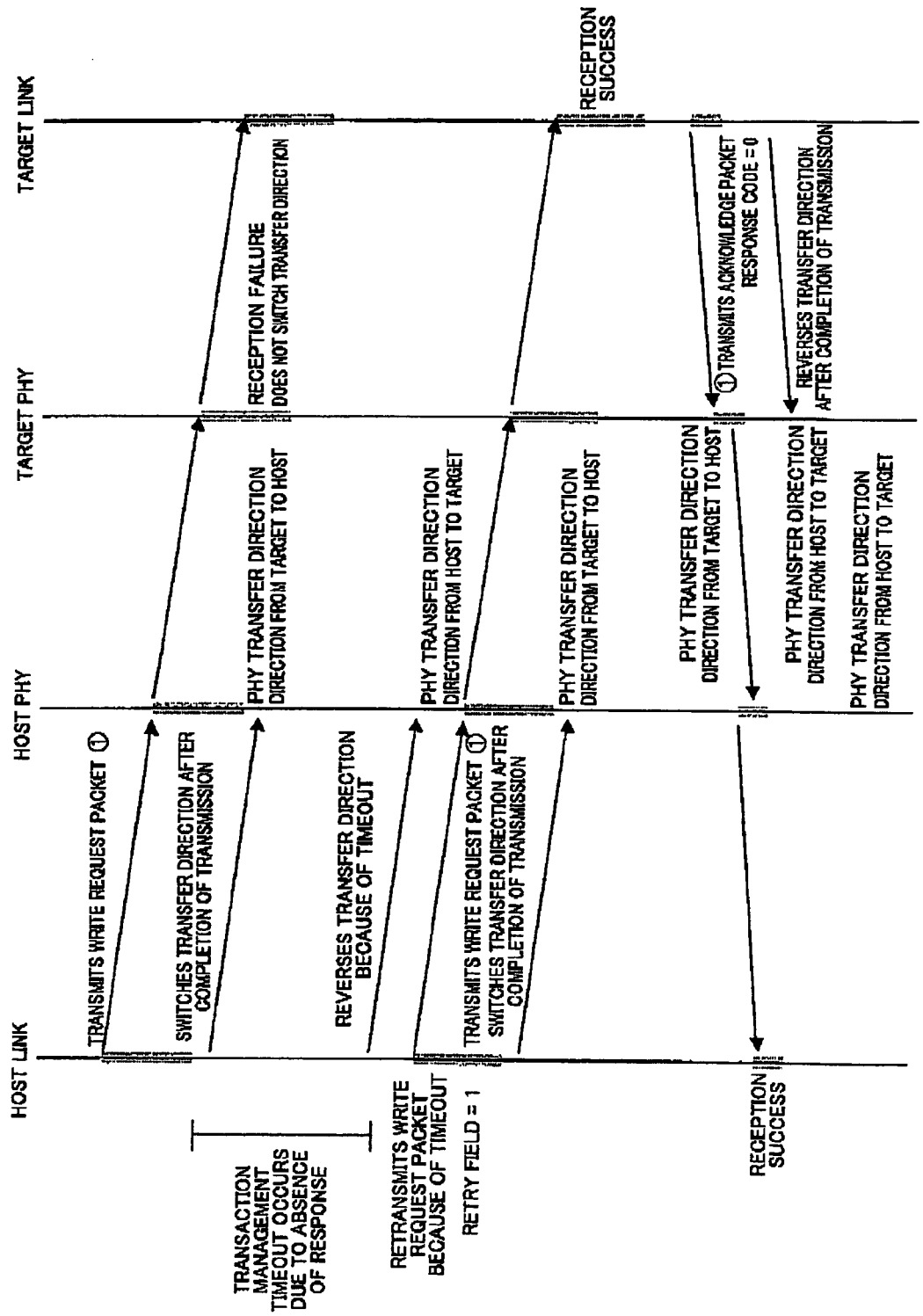
FIG. 20 is a first failure example of a command/data write transaction.

FIG. 20 is a first failure example of a command/data write transaction in the half-duplex transfer method. In FIG. 20, a reception error has occurred at the time of or before detection of the transfer direction switch request code (Direction). In more detail, a preamble error or a decode error has occurred. In this case, as shown in FIG. 20, switching of the transfer direction on the target side is canceled.

When a response has not been returned from the target when a predetermined period of time has elapsed after completion of transmission and a timeout has occurred, the LINK of the host issues the transfer direction switch request which causes the transfer direction to be reversed from the reception direction. This causes the PHY of the host to reverse the transfer direction from the reception direction to the transmission direction. In this case, since switching of the transfer direction has not been performed on the target side, the transmitter circuit of the host and the transmitter circuit of the target can be prevented from being connected with single serial signal lines.

The LINK of the host sends a write request packet in which "1" is set in the retry field due to occurrence of a timeout. After completion of transmission of the write request packet, the PHY switches the transfer direction to the reception direction. When the LINK of the target has succeeded in receiving the write request packet, the processing is performed as shown in FIG. 19.

Figure 21:
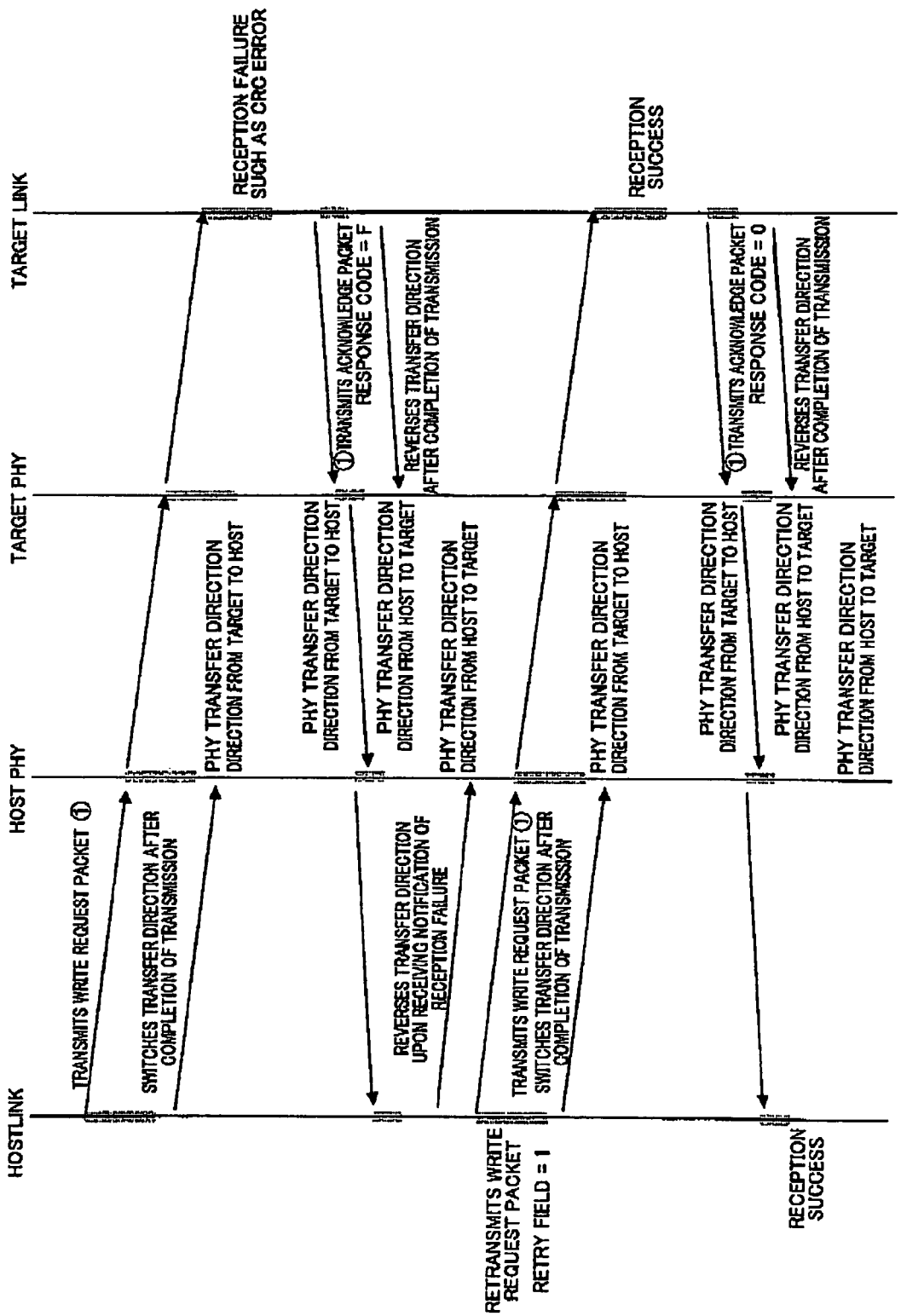
FIG. 21 is a second failure example of a command/data write transaction.

FIG. 21 is a second failure example of a command/data write transaction in the half-duplex transfer method. In FIG. 21, a reception error has occurred after detection of the transfer direction switch request code (Direction). In more detail, a CRC error has occurred. In this case, since cancellation of the transfer direction switch cannot be performed on the target side in FIG. 22. differing from FIG. 20, the target-side transfer direction is changed to the transmission direction.

The LINK of the target then transmits an acknowledge packet for indicating a CRC error. In more detail, a value of "F", which means CRC error (data failure), is written into the response code field of the acknowledge packet. The LINK requests switching of the transfer direction which causes the transfer direction to be switched from the transmission direction to the reception direction after transmission of the acknowledge packet has been completed.

Upon receiving the acknowledge packet indicating the CRC error from the target, the LINK of the host requests that the transfer direction be returned from the reception direction to the transmission direction. The LINK of the host writes "1" into the retry field, and retransmits the write request packet. The subsequent processing is the same as the sequence shown in FIG. 20.

Figure 22:
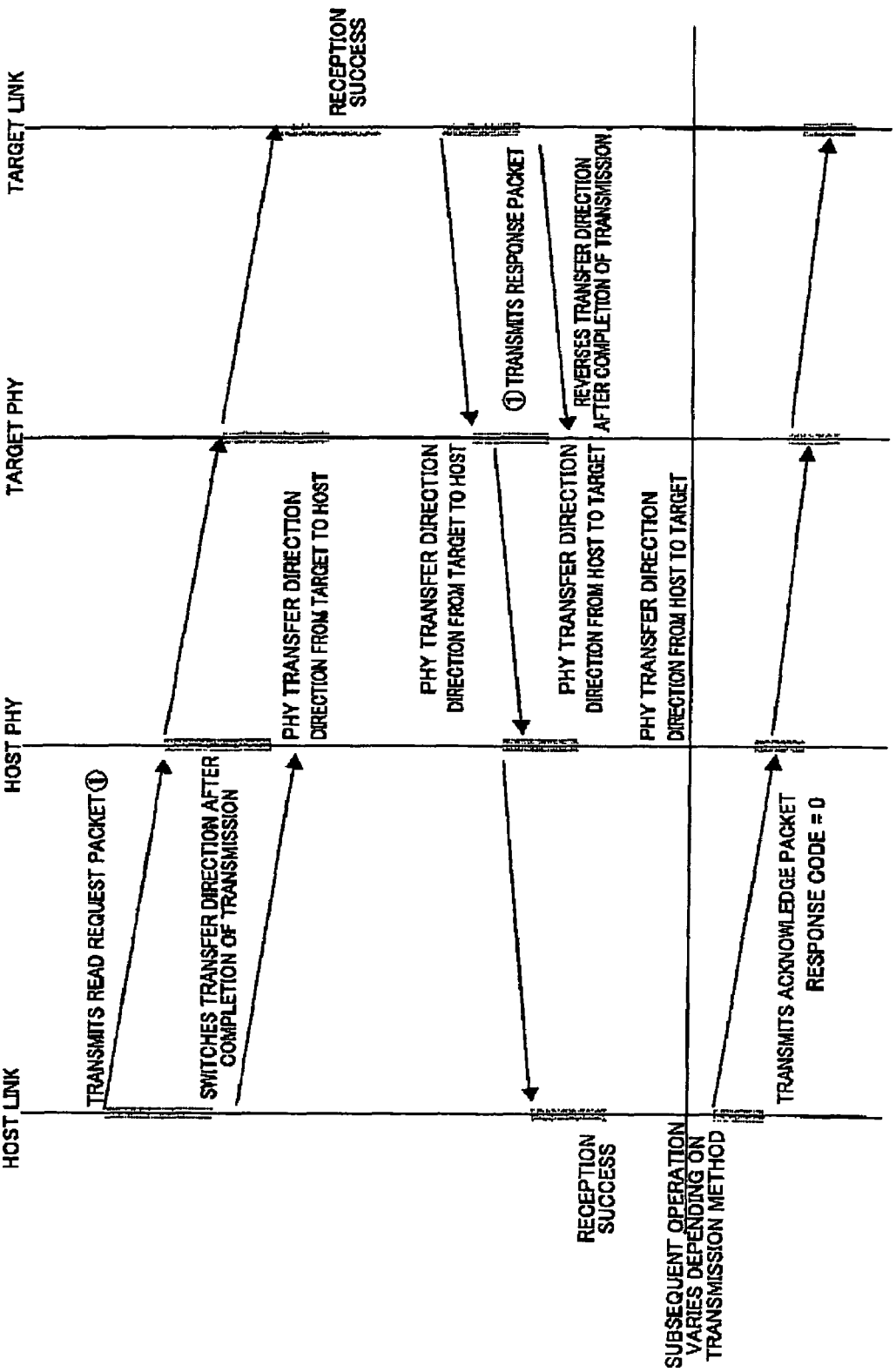
FIG. 22 shows a success example of a read transaction of a command/data.

FIG. 22 shows a success example of a read transaction of a command/data in the half-duplex transfer method. The basic idea concerning transfer direction switch is the same as in FIG. 19.

11. Electronic Instrument

Figure 23:
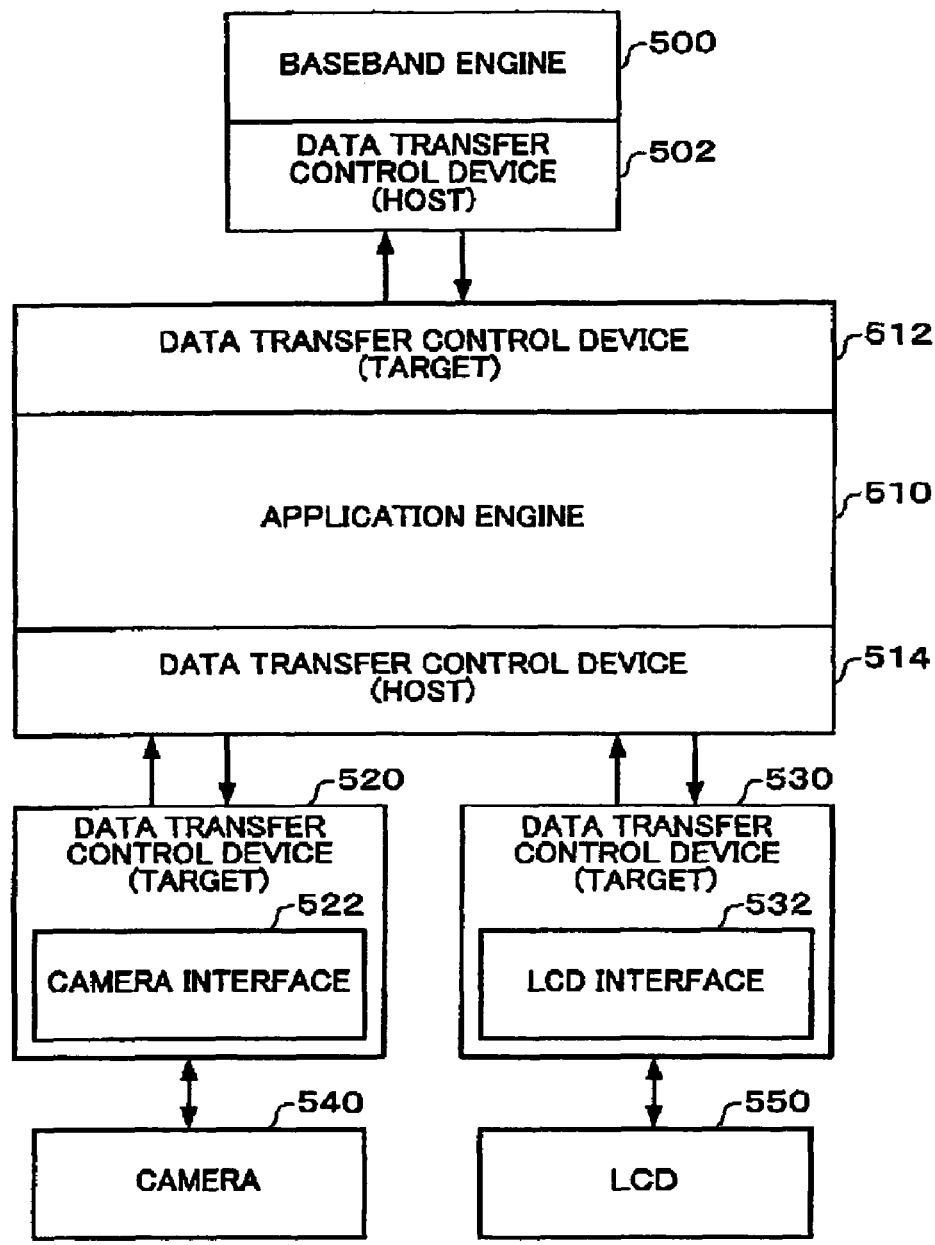
FIG. 23 shows an electronic instrument.

FIG. 23 shows an electronic instrument. This electronic instrument includes data transfer control devices 502, 512, 514, 520, and 530 according to an embodiment of the present invention. The electronic instrument also includes a baseband engine 500 (communication device in a broad sense), an application engine 510 (processor in a broad sense), a camera 540 (imaging device in a broad sense), and an LCD 550 (display device in a broad sense). In other words, the electronic instrument shown in FIG. 23 includes the target-side data transfer control devices 520 and 530, the host-side data transfer control device 514 connected with the target-side data transfer control devices 520 and 530 through a serial bus (serial signal lines), and one or more devices 540 and 550 connected with the target-side data transfer control devices 520 and 530 through an interface bus. Some of these sections may be omitted. According to this configuration, a portable telephone or the like having a camera function and a display function of a liquid crystal display (LCD) can be implemented. However, the electronic instrument in this embodiment is not limited to the portable telephone, and may be applied to various electronic instruments such as a digital camera, PDA, electronic notebook, electronic dictionary, or portable information terminal.

As shown in FIG. 23, the serial transfer described in this embodiment is performed between the host-side data transfer control device 502 provided to the baseband engine 500 and the target-side data-transfer-control-device 512 provided to the application engine 510 (graphic engine). The serial transfer described in this embodiment is also performed between the host-side data transfer control device 514 provided to the application engine 510 and the data transfer control device 520 including a camera interface circuit 522 or the data transfer control device 530 including an LCD interface circuit 532.

According to the configuration shown in FIG. 23, EMI noise can be reduced in comparison with a conventional electronic instrument. Moreover, power consumption of the electronic instrument can be further reduced by implementing a reduction of the scale and power consumption of the data transfer control device. In the case where the electronic instrument is a portable telephone, a serial signal line can be used as a signal line which passes through a connection section (hinge section) of the portable telephone, whereby mounting can be facilitated.

The present invention is not limited to the above-described embodiment. Various modifications and variations may be made. For example, Any term (link controller, 8B/10B encoder circuit, 8B/10B decoder circuit, 8 bits, 10 bits, positive code, negative code, differential signal line, and the like) cited with a different term having broader or the same meaning (upper layer circuit, encoder circuit, decoder circuit, N bits, M bits, first polarity, second polarity, serial signal line, and the like) at least once in this specification and drawings can be replaced by the different term in any place in this specification and drawings. The configurations of the data transfer control device, the transceiver, the link controller, and the like are not limited to the configurations described with reference to FIGS. 1 to 3. The half-duplex transfer method is not limited to the method described in this embodiment.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A data transfer control method for controlling data transfer between a host and a target,
the host includes a first data transfer control device,
the target includes a second data transfer control device,
the first and second data transfer control devices connected through a serial signal line, each of the first and second data transfer control devices including:
a transmitter circuit that transmits data by current-driving the serial signal line using a half-duplex transfer method;
a receiver circuit that receives data by detecting current flowing through the serial signal line using the half-duplex transfer method; and
a transfer direction switch circuit that performs switching between a transmission direction and a reception direction, the transmission direction being a transfer direction in which data is transmitted by the transmitter circuit, and the reception direction being a transfer direction in which data is received by the receiver circuit;
in the method:
the transmitter circuit of the first data transfer control device transmitting the transfer direction switch request code through the serial signal line in addition to data transmitted through the serial signal line,
the transmitter circuit of the first data transfer control device outputting an idle signal, logical level of which being continuously fixed at a first logical level in units of a given number of bits or more to the serial signal line after transmitting the transfer direction switch request code through the serial signal line,
the transfer direction switch circuit of the first data transfer control device switching the transfer direction from the transmission direction to the reception direction when outputting the idle signal of a given number of bits, and the transfer direction switch circuit of the second data transfer control device switching the transfer direction from the reception direction to the transmission direction when the second data transfer control device has detected the idle signal of a given number of bits after detecting the transfer direction switch request code.

2. The data transfer control method as defined in claim 1, when a reception error has occurred on the target side after the host has transmitted the transfer direction switch request code, the transfer direction switch circuit of the second data transfer control device canceling switching of the transfer direction from the reception direction to the transmission direction, the transfer direction switch circuit of the first data transfer control device reversing transfer direction from the reception direction to the transmission direction without transmitting the transfer direction switch request code again when a timeout occurs, the timeout occurring if a predetermined period of time has elapsed without receiving a response packet from the second data transfer control device after transmission of the transmitter circuit of the first data transfer control device has been completed.

3. The data transfer control method as defined in claim 2, the transfer direction switch circuit of the second data transfer control device canceling switching of the transfer direction from the reception direction to the transmission direction when the reception error has occurred at the time of or before detection of a transfer direction switch request code from the first data transfer control device to the second data transfer control device.

4. An electronic instrument, comprising:
a host and a target carrying out data transfer control method as defined in claim 1.

5. An electronic instrument, comprising:
a host and a target carrying out data transfer control method as defined in claim 2.

6. An electronic instrument, comprising:
a host and a target carrying out data transfer control method as defined in claim 3.

7. A data transfer control method for controlling data transfer between a host and a target that are connected through a serial signal line,
the host including a first data transfer control device,
the target including a second data transfer control device,
the first data transfer control device including:
a first transceiver that includes a first transmitter circuit that transmits data by current-driving the serial signal line, a first receiver circuit that receives data by detecting current flowing through the serial signal line, and a first transfer direction switch circuit that performs switching between a transmission direction and a reception direction, the transmission direction being a transfer direction in which data is transmitted by the first transmitter circuit, and the reception direction being a transfer direction in which data is received by the first receiver circuit; and
a first upper layer circuit that controls the first transceiver, and
the second data transfer control device including:
a second transceiver that includes a second transmitter circuit that transmits data by current-driving the serial signal line, a second receiver circuit that receives data by detecting current flowing through the serial signal line, and a second transfer direction switch circuit that performs switching between a transmission direction and a reception direction, the transmission direction being a transfer direction in which data is transmitted by the second transmitter circuit, and the reception direction being a transfer direction in which data is received by the second receiver circuit; and
a second upper layer circuit that controls the second transceiver,
in the method:
the first upper layer circuit of the host transmitting first transmission data and a transfer direction switch request code added to the first transmission data by controlling the first transceiver,
outputting an idle signal to the serial signal line after transmitting the transfer direction switch request code, a logical level of the idle signal being continuously fixed at a first logical level in units of a given number of bits or more,
switching the transfer direction from the transmission direction to the reception direction by controlling the first transfer direction switch circuit when outputting the idle signal of the given number of bits or more,
confirming reception success of the target when a response received from the target within a given period after switching the transfer direction from the transmission direction to the reception direction is a reception success notification, and switching the transfer direction from the reception direction to the transmission direction by controlling the first transfer direction switch circuit,
confirming a reception failure of the target when the response is a reception failure notification, switching the transfer direction from the reception direction to the transmission direction by controlling the first transfer direction switch circuit, and retransmitting the first transmission data by controlling the first transceiver, and
switching the transfer direction from the reception direction to the transmission direction by controlling the first transfer direction switch circuit when a response has not been received from the target after a predetermined period of time has elapsed after switching the transfer direction from the transmission direction to the reception direction so that a timeout has occurred, and retransmitting the first transmission data by controlling the first transceiver without transmitting the transfer direction switch code, and
the second upper layer circuit of the target switching the transfer direction from the reception direction to the transmission direction by controlling the second transfer direction switch circuit when the first transmission data transmitted from the host has been received and the idle signal of the given number of bits or more has been detected, and transmitting the reception success notification by controlling the second transceiver,
switching the transfer direction from the reception direction to the transmission direction by controlling the second transfer direction switch circuit when the first transmission data transmitted from the host has been received by the second transceiver, a reception error has been detected by the second upper layer circuit, and the idle signal of the given number of bits or more has been detected, transmitting the reception failure notification by controlling the second transceiver, switching the transfer direction from the transmission direction to the reception direction by controlling the second transfer direction switch circuit after completion of transmission of the reception failure notification, and waiting for the host to retransmit the first transmission data,
maintaining the reception direction of the second transceiver without switching the transfer direction when the second transceiver has failed in receiving the first transmission data transmitted from the host, and waiting for the host to retransmit the first transmission data after the timeout has occurred.

8. The data transfer control method as defined in claim 7, the first upper layer circuit suspending an operation of at least one of a plurality of circuits included in the first transceiver during a period in which the idle signal is output to the serial signal line, the logical level of the idle signal being continuously fixed at the first logical level in units of the given number of bits.

9. An electronic instrument, comprising:

a host that includes a first data transfer control device and a target that includes a second data transfer control device, the first data transfer control device and the second data transfer control device carrying out the data transfer control method as defined in claim 7.

* * * * *